(12) United States Patent
Jallat et al.

(10) Patent No.: US 12,535,130 B2
(45) Date of Patent: Jan. 27, 2026

(54) GEARBOX ARRANGEMENT PROVIDING PARTIAL VACUUM WITHIN A GEARBOX DEVICE AS WELL AS METHOD OF EFFICIENTLY PROVIDING AND MAINTAINING PARTIAL VACUUM AND USE

(71) Applicant: Flender-Graffenstaden S.A.S., Illkirch-Graffenstaden (FR)

(72) Inventors: Eric Jallat, Illkirch-Graffenstaden (FR); Thomas Gaulier, Illkirch-Graffenstaden (FR)

(73) Assignee: Flender-Graffenstaden S.A.S., Illkirch-Graffenstaden (FR)

( * ) Notice: Subject to any disclaimer, the term of this patent is extended or adjusted under 35 U.S.C. 154(b) by 0 days.

(21) Appl. No.: 19/109,944

(22) PCT Filed: Sep. 21, 2023

(86) PCT No.: PCT/EP2023/076003
§ 371 (c)(1),
(2) Date: Mar. 7, 2025

(87) PCT Pub. No.: WO2024/068408
PCT Pub. Date: Apr. 4, 2024

(65) Prior Publication Data
US 2025/0271056 A1  Aug. 28, 2025

(30) Foreign Application Priority Data

Sep. 27, 2022 (EP) .................................... 22197937

(51) Int. Cl.
*F16H 57/04* (2010.01)
(52) U.S. Cl.
CPC ..... *F16H 57/0409* (2013.01); *F16H 57/0435* (2013.01); *F16H 57/0441* (2013.01); *F16H 57/0449* (2013.01)

(58) Field of Classification Search
CPC .......................... F16H 57/0435; F16H 57/0441
See application file for complete search history.

(56) References Cited

U.S. PATENT DOCUMENTS 3,489,034 A * 1/1970 Moore ................ F16H 57/0409
74/606 R
4,075,912 A * 2/1978 Schaefer ............. F16H 61/0267
477/906
(Continued)

FOREIGN PATENT DOCUMENTS

FR    3 035 164    10/2016
WO    WO 96/15392    5/1996
(Continued)

OTHER PUBLICATIONS

International Search Report issued by the European Patent Office on Dec. 19, 2023 in International Application PCT/EP2023/076003.

*Primary Examiner* — Daniel D Yabut
(74) *Attorney, Agent, or Firm* — Henry M. Feiereisen LLC

(57) ABSTRACT

A gearbox arrangement includes at least one turbo gearbox device and is designed to provide partial vacuum within the gearbox device. The gearbox arrangement includes a vacuum pump, a vacuum oil tank, an oil pump coupled to the vacuum oil tank, a plurality of valves; a sensor unit and a control unit which is designed to control at least the vacuum pump and the oil pump respectively depending on momentary sensor data. The vacuum oil tank and at least one of the valves provide for a switchable siphon arrangement such that a predefinable vacuum level is ensured within the Inner volume by means of the vacuum pump and via the vacuum oil tank and by controlling the vacuum pump depending on momentary sensor data.

20 Claims, 13 Drawing Sheets

(56) References Cited

U.S. PATENT DOCUMENTS

| | | | |
|---|---|---|---|
| 5,101,936 A | 4/1992 | Paredes et al. | |
| 5,950,501 A | 9/1999 | Deeg et al. | |
| 6,374,949 B2 | 4/2002 | Schwertberger | |
| 7,954,599 B2 * | 6/2011 | Antonetti | F16H 57/0434 |
| | | | 184/6.12 |
| 2005/0139427 A1 | 6/2005 | Antonetti et al. | |
| 2012/0211307 A1 | 8/2012 | Nielsen | |
| 2016/0305537 A1 | 10/2016 | Sterns et al. | |
| 2017/0059031 A1 * | 3/2017 | Doertoluk | F03D 80/70 |
| 2021/0088029 A1 | 3/2021 | Rog | |

FOREIGN PATENT DOCUMENTS

| | | | | |
|---|---|---|---|---|
| WO | WO 03/074903 | | 9/2003 | |
| WO | WO-2015058900 A1 * | 4/2015 | ......... | F16H 57/0442 |

* cited by examiner

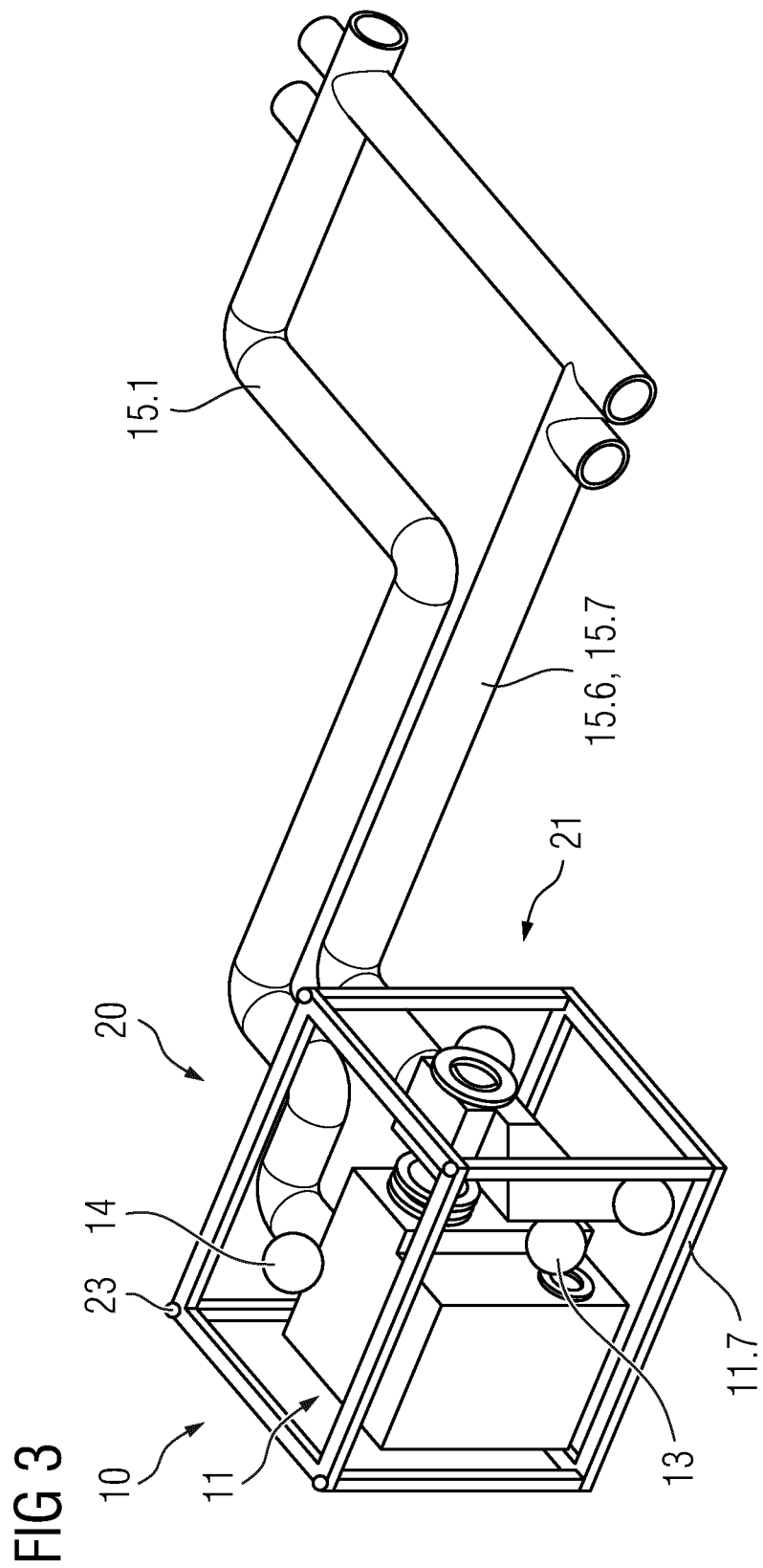

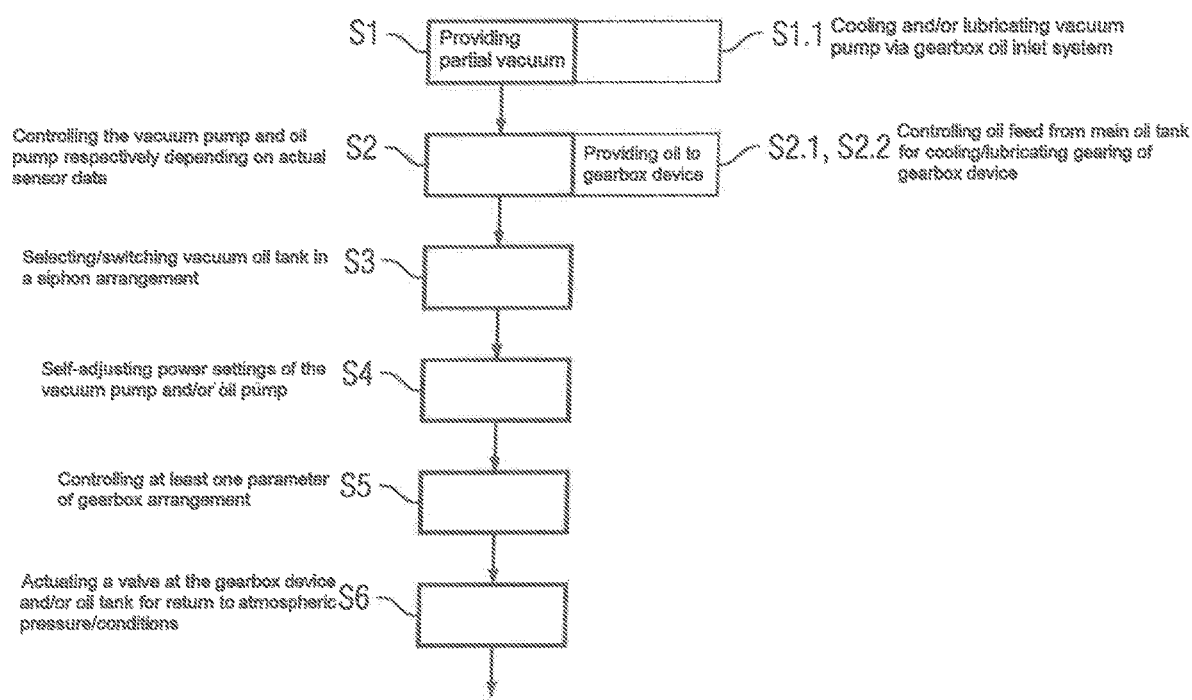

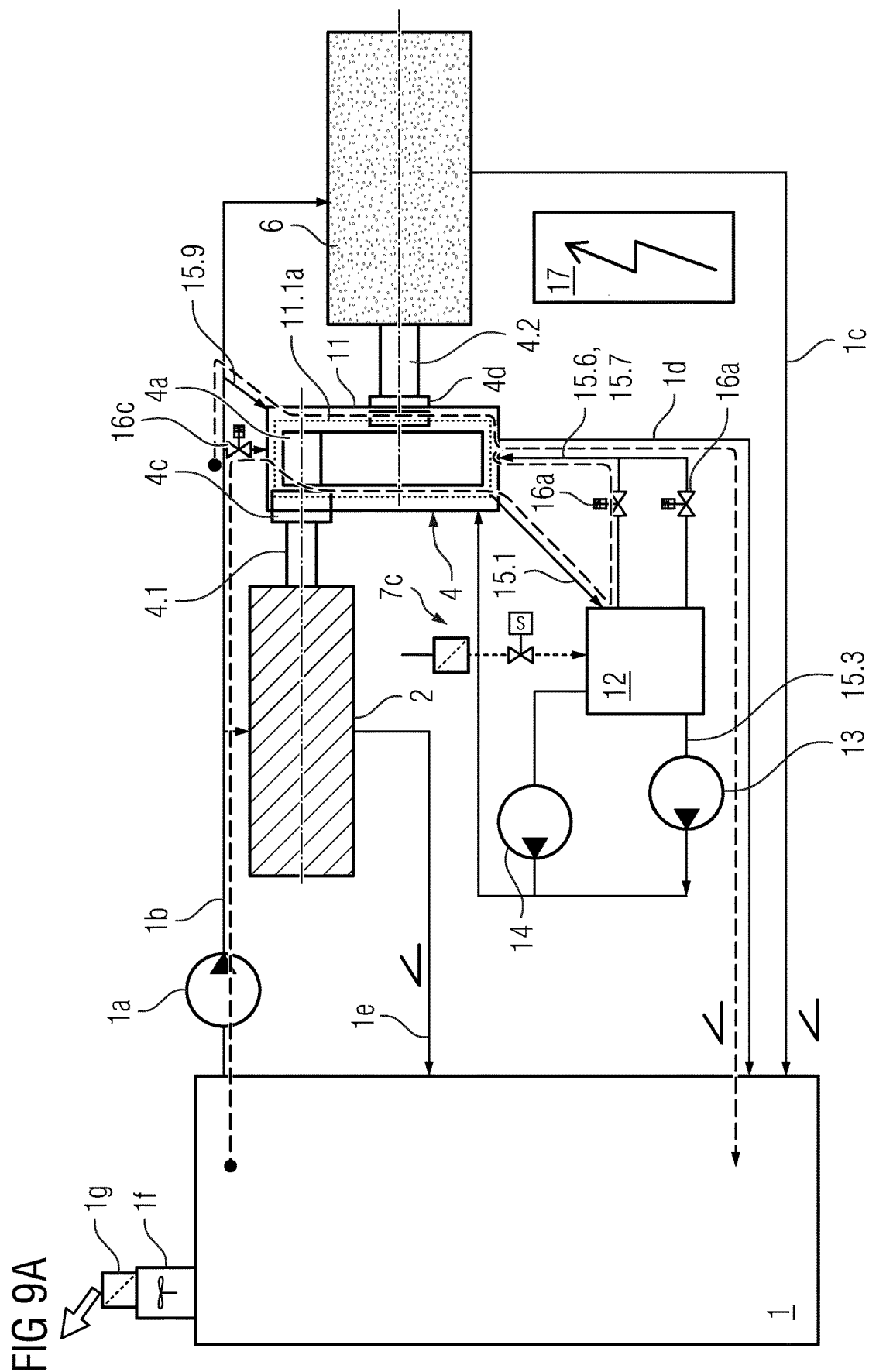

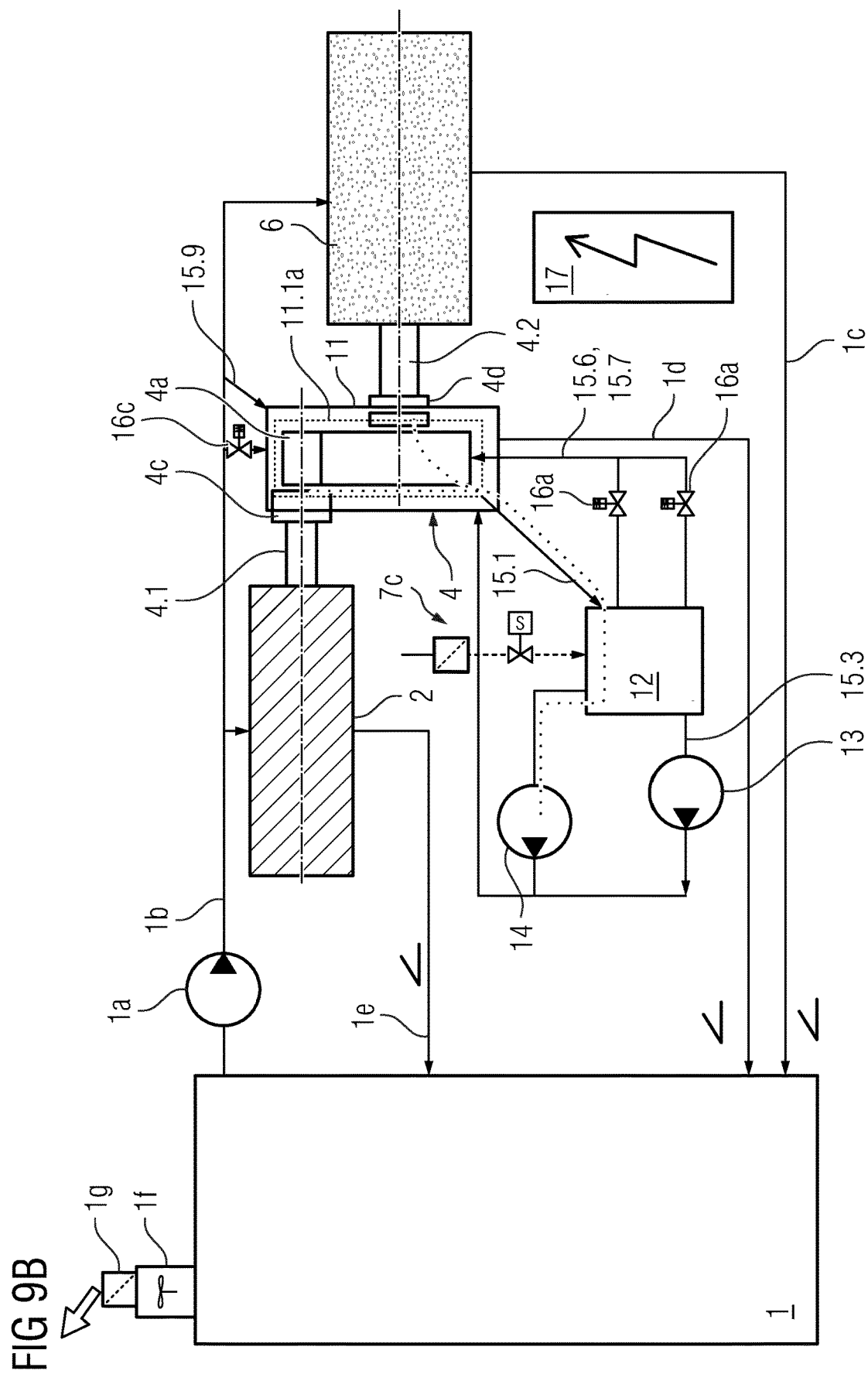

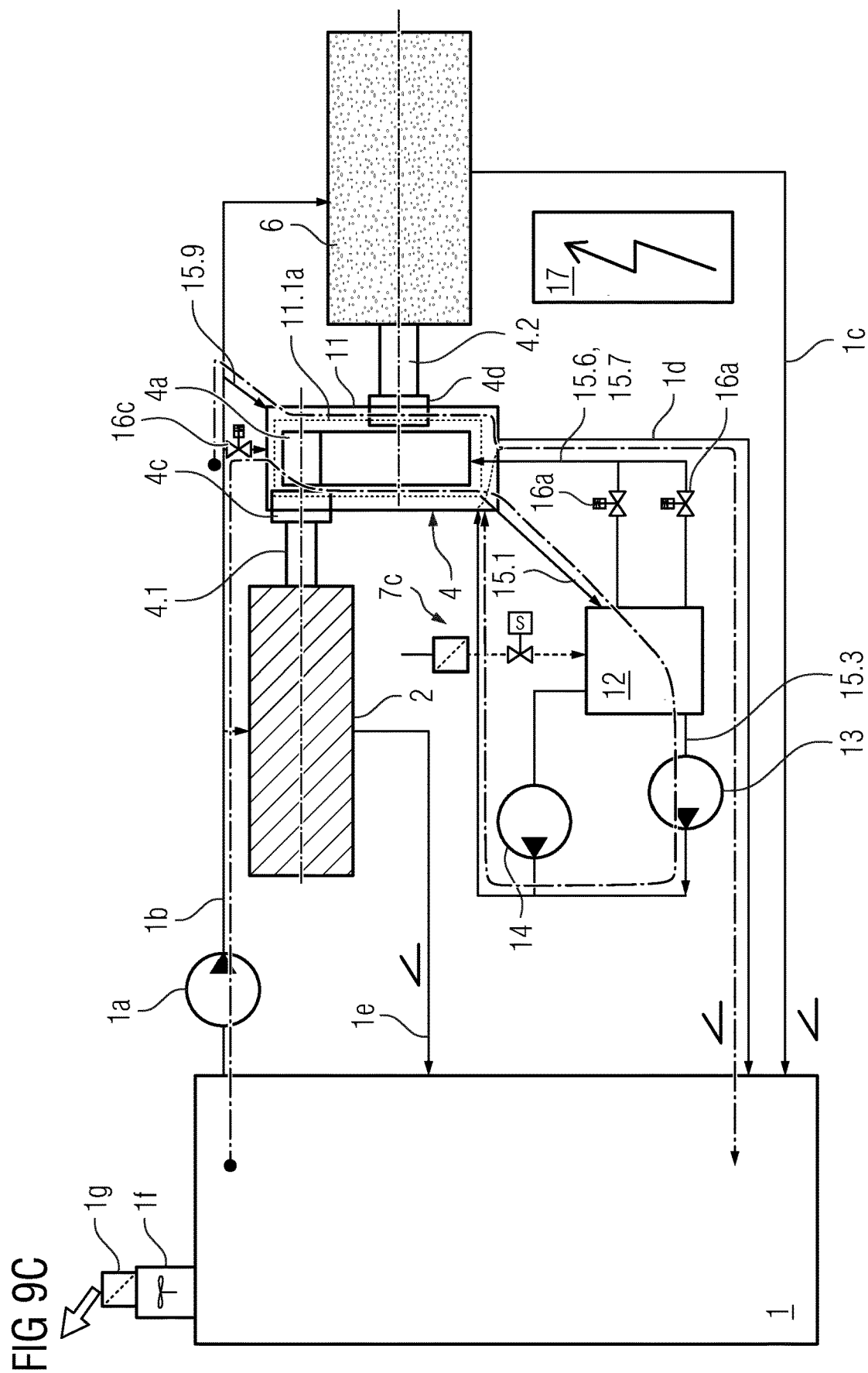

GEARBOX ARRANGEMENT PROVIDING PARTIAL VACUUM WITHIN A GEARBOX DEVICE AS WELL AS METHOD OF EFFICIENTLY PROVIDING AND MAINTAINING PARTIAL VACUUM AND USE

CROSS-REFERENCES TO RELATED APPLICATIONS

This application is the U.S. National Stage of International Application No. PCT/EP2023/076003 filed Sep. 21, 2023, which designated the United States and has been published as International Publication No. WO 2024/068408 A1 and which claims the priority of European Patent Application, Ser. No. 22/197,937.0, filed Sep. 27, 2022, pursuant to 35 U.S.C. 119(a)-(d).

TECHNICAL FIELD

The present invention refers to gearbox arrangements exhibiting at least one turbo gearbox device, wherein the gearbox arrangement provides partial vacuum to the gearbox device (especially within an inner volume/cavity defined within a housing of the gearbox), wherein the gearbox arrangement comprises a vacuum pump, a vacuum oil tank, an oil pump coupled to the vacuum oil tank, a plurality of valves, a piping connecting the vacuum oil tank and the gearbox device and the vacuum pump, a sensor unit, and a control unit for controlling at least the vacuum pump and the oil pump. The present invention also refers to gearboxes being coupled to/with vacuum components for ensuring partial vacuum within the gearbox. Furthermore, the present invention refers to methods of providing and maintaining partial vacuum within at least one turbo gearbox device in a gearbox arrangement, wherein a vacuum pump communicates with an inner volume (cavity) of the gearbox device, wherein an oil pump coupled to a vacuum oil tank provides oil to the gearbox device and optionally also to a lubricating piping, wherein a control unit controls at least the vacuum pump and the oil pump. In particular, the present invention refers to gearbox arrangements and methods according to the respective present independent claim.

BACKGROUND OF THE INVENTION

Gearbox devices are often installed in high power drive trains. Effectively reducing power losses can be considered a strict requirement especially in context with high efficiency and high speed/power gearbox devices. Previously known gearboxes, especially fixed-ratio transmission gearboxes, can be provided with partial vacuum at the gearing/toothing, which is considered an effective measure especially in case efficiency of more than 99% is required, especially in turbo gearboxes. The present invention deals with further improvements in context with provision of such partial vacuum.

It is already known that some losses are due to lubricant and coolant present between the gear teeth, and/or due to gas turbulence created by toothed parts operating at high speed, and/or due to friction between teeth of the toothing and in the bearings supporting the rotating shafts. In partial vacuum, losses due to turbulence caused by high peripheral speeds of the teeth can be reduced considerably. The present invention focuses on the kind of operation of pumps involved in the process of creating and maintaining said partial vacuum while ensuring high efficiency, wherein specific ways of using lubricant and coolant can be involved, too.

U.S. Pat. No. 6,374,949 B2 describes a safety device for a lubrication system of a transmission device, wherein a partial vacuum is maintained by means of a vacuum pump, wherein the pressure and the oil charge/volume are monitored by means of sensors.

FR 3 035 164 B1 describes a transmission device for partial vacuum operation in which the toothing lubricating oil can be fed to an oil collecting receptacle external to a gear unit via a delivery pump by at least partially separating it from the bearing lubricating oil (in partial vacuum operation), and wherein the toothing lubricating oil can also be conveyed to the oil collecting receptacle via a check valve (in atmospheric operation).

WO 96/15392 A1 describes the concept of providing a gas to or a partial vacuum within a gearbox, wherein air can be evacuated from the gearbox by means of a pump which is also suitable for removing oil, and wherein gear wheels are fitted in radial bearings and preferably also within an additional inner housing.

WO 2003/074903 A2 describes a gear mechanism configured for generating a rarefied atmosphere and comprising means for reducing the gas pressure in a casing housing at least two toothed parts, wherein a first receptacle communicates with a second receptacle which communicates with a storage tank, wherein the receptacles and the storage tank are disposed such that oil is able to flow into them successively by gravitational flow.

U.S. Pat. No. 5,101,936 A discloses a vacuum operated dry sump system comprising a gearbox device, a vacuum oil tank, an oil pump coupled to the vacuum oil tank and a valve; wherein the vacuum oil tank and the valve provide for a selectable/switchable siphon arrangement such that a predefinable vacuum level is ensured within an inner volume of the gearbox device by means of the vacuum pump and via the vacuum oil tank.

Starting from this situation, the present invention focuses on improved efficiency of a gearbox arrangement providing for partial vacuum, wherein improvements ensuring functioning/behaviour both in partial vacuum and in atmospheric operation can be considered.

SUMMARY OF THE INVENTION

It is an object of the present invention to provide for a concept allowing for high efficiency of gearbox arrangements operating in partial vacuum and optionally also in atmospheric conditions, wherein the functioning/behaviour of involved pumping technology and optionally also the manner of using lubricating or cooling media is to be improved. In particular, a/the object of the present invention is to ensure high efficiency and also high system safety of gearbox devices mainly operating in partial vacuum (e.g. about 500 mbara or ca. 50% lower than environmental or ambient pressure) in context with a great degree of functionality, especially for turbo gearboxes, wherein both operation in partial vacuum and operation in atmospheric conditions are preferably considered and optimized. Particularly turbo gearbox devices run at very high speed.

The object of the invention is solved by the features of the independent main claims. Advantageous features are indicated in the subclaims. The features of the subclaims can be combined with the features of the main claims and further subclaims.

One aspect of the invention relates to a gearbox arrangement including an improved pump arrangement (and process).

In particular, the object is therefore solved by a gearbox arrangement exhibiting at least one turbo gearbox device, especially exhibiting a high efficiency turbo gearbox device, wherein the gearbox arrangement is configured for providing partial vacuum within the gearbox device, the gearbox arrangement comprising a vacuum pump communicating with an inner volume (cavity of partial vacuum) of the gearbox device, a vacuum oil tank (which is separate from a main oil tank of the gearbox device), an oil pump coupled to the vacuum oil tank, a plurality of valves, a piping connecting the vacuum oil tank and the gearbox device and the vacuum pump; wherein the gearbox arrangement further comprises a sensor unit comprising at least one sensor, wherein the gearbox arrangement further comprises a control unit configured for controlling at least the vacuum pump and the oil pump (and optionally further relevant valves and/or instrumentation) respectively depending on actual sensor data of the at least one sensor, wherein the vacuum oil tank and at least one of the valves provide for a selectable/switchable siphon arrangement such that a predefined/predefinable vacuum level is ensured within the inner volume (partial vacuum cavity) by means of the vacuum pump and via the vacuum oil tank, wherein the predefined/predefinable vacuum level is controlled/controllable (can be controlled according to predefinable modes of operation) by controlling the vacuum pump depending on actual sensor data of the at least one sensor, the sensor data comprising at least one of the following types of data: pressure sensor data related to a/the vacuum level within the inner volume (partial vacuum cavity), air leakage sensor data related to the gearbox device. Such configuration also ensures effective and efficient operation of the vacuum pump especially in view of actual conditions.

In other words, the present invention also provides for a kind of efficiency booster especially for turbo gearboxes (high speed and high power gearboxes). In particular, the present invention can favourably be implemented e.g. in any turbo gearboxes requiring global efficiency larger than 99% and having initially an efficiency close to e.g. 98.5% already. This efficiency level is already attained by some types of gearboxes especially in the field of power generation as well as oil and gas industry. Thus, the present invention provides for further improvements in context with remaining 1% of losses (which can be far from negligible especially in high-power arrangements). Some of the advantages of the present invention can be summarized as follows:

- the invention allows for effectively reducing power losses (specifically windage losses and pumping losses) especially in context with minimum 99% efficiency levels;
- the invention allows for effectively and efficiently reducing the atmospheric pressure surrounding the teeth (partial vacuum level of e.g. ca. 500 mbara or below);
- the speed of rotation of a/the vacuum pump is controlled resp. can be controlled based on actual sensor data and can be configured self-adjusting especially in context with feedback control;
- likewise, the quantity of oil to cool down the teeth can be controlled resp. is controlled based on actual sensor data and can be configured self-adjusting;
- the present invention can favour longer maintenance intervals at least for a/the vacuum pump but also for further components involved, especially prolonged at least by factor 5 or even 10;
- further, the present invention allows for easily implementing resistance against electric black out or micro-cut, especially including a restart modus (restart on its own terms/conditions);
- the present invention may include a record and storing function (especially within the control unit), especially by an automated algorithm provided by a/the control unit, at least regarding the main relevant running parameters, thereby facilitating monitoring and control of the gearbox device and associated components;

The present invention can be realized e.g. in the following types of systems: embedded or stand-alone. Oil dedicated to the cooling of the toothing or to the lubrication of the whole gearbox can be transferred likewise, especially depending on the type of system (embedded or stand-alone). It should be noted that in an embedded implementation, oil transit advantageously is realized by the bottom side of the gearbox, i.e., there is no need for re-injection to cool or lubricate the toothing. After passing by the bottom of the gearbox (where the oil can be mixed with oil from the bearings), the oil is transferred by gravity to a/the main lube oil tank.

In contrast, in prior art, in existing gearbox vacuum systems, the partial vacuum is created resp. controlled by means of check valves instead of automatic valves, and/or the vacuum pump speed is fixed/predefined (instead of variable and controlled referring to desired vacuum level and air flow entering the gearbox), and/or the oil flow on/to the toothing is predefined (instead of controlled), and/or no provisions are made in context with a capacity of maintenance or an ability to deal with black outs or electric micro cuts or with a controlled record and storage of main parameters.

The present invention provides for a general concept which allows, at the same time, for high efficiency, for high system security and high processual variability, especially in context with quite slim design (device and process). Also, status monitoring is facilitated especially based on sensor data provided by the sensor unit described herein, at least referring to power level of at least the vacuum pump and level of partial vacuum, especially also based on sensor data provided by at least one accelerometer measuring the operational state of the vacuum pump (especially in context with system monitoring and maintenance, e.g. providing for longer maintenance intervals increased by more than factor 5 or even 10).

The turbo gearbox device of the gearbox arrangement is particularly designed for a speed of up to 5,000 revolutions a minute, particularly up to 10,000 revolutions a minute, preferably up to 25,000 revolutions a minute and particularly preferred up to 50,000 revolutions a minute. Particularly the turbo gearbox device is designed for an output power of up to 0.2 MW, preferably up to 5 MW, particularly up to 50 MW and particularly preferred up to 100 MW. The turbo gearbox device may provide an efficiency of at least 97%, particularly at least 98% and preferably at least 99%. A turbo gearbox providing ab efficiency of at least 99% is also known as "high efficiency turbo gearbox device".

According to the present disclosure, the term "vacuum oil tank" designates a tank which is different from a main (lube) oil tank, and which is arranged within (or which is part of) the siphon arrangement, and which allows for, in at least one of several operating conditions, buffering oil flow from the gearbox to the main (lube) oil tank (whereas main oil feed is provided by the at least one oil tank directly coupled to the gearbox) resp. via the gearbox to the main lube oil tank (especially with the oil flow being driven by gravity within the section from the gearbox to the main lube oil tank).

According to the present disclosure, the term "inner volume" (cavity/area of partial vacuum) of the gearbox device designates the area in which the partial vacuum should/shall be provided as intended (e.g. 500 mbara). This inner volume may e.g. comprise an area enclosing a pinion and a wheel and being partitioned/encapsulated by at least one additional sealing especially on the shafts involved in this area.

According to the present disclosure, the term "volume" of the gearbox device generally designates a volume enclosed by a/the housing of the gearbox.

In the following, some of the units and components of the present invention are described in general, by referring to some of the features in more detail. In particular, the inventive device/process may comprise at least some of the following constituents: gearbox, at least one vacuum oil tank (in addition to a main oil tank providing oil to the gearbox), pipes connecting the vacuum oil tank and the gearbox, at least one oil pump, at least one vacuum pump (preferably adjustable/controllable in speed/power level in accurate manner), automatic valves providing for automatic actuation of switchable siphon function, at least one sensing unit and a control unit. In particular, the inventive device/process can favourably be implemented in context with the following constituents: an oil high pressure system, shaft sealings allowing for controlling air flow entering an inner housing of the gearbox.

In the following, a favourable mode of operation is described in more detail: A/the vacuum oil tank is interconnected between the gearbox device and the vacuum pump such that it can act as a siphon (which functionality is preferably switchable by means of at least one automatic valve), wherein the vacuum oil tank allows the vacuum to be contained only in the gearbox and in an upper part of this tank. A piping comprising at least three pipes ensures efficient coupling of the vacuum pump and the gearbox device and the vacuum oil tank, wherein the piping comprises at least one pipe connecting the gearbox to the vacuum oil tank, and at least two pipes connecting the vacuum oil tank to the bottom part of the gearbox or to a piping system connecting the gearbox to a/the lubricating system of the gearbox arrangement (or plant). These pipes can be reduced in length to a minimum especially in case embedded implementation is realized. According to one embodiment, the piping comprises at least seven pipes providing functionality in context with partial vacuum, namely a first pipe (suction pipe connecting the gearbox inner volume and the oil tank), a second pipe (suction pipe connecting the oil tank and the vacuum pump), a third pipe (coupling oil pipe connecting the oil tank and the oil pump and the gearbox device, wherein this coupling pipe can advantageously be linked to one of the sixth and seventh pipe), a fourth pipe (an oil suction/feeding pipe connecting the gearbox device and the vacuum pump, providing for cooling and/or lubricating oil), a fifth pipe (oil refeeding pipe connecting the vacuum pump and the gearbox device, wherein this refeeding pipe can advantageously be linked to one of the sixth and seventh pipes), a sixth pipe and a seventh pipe (first and second atmospheric coupling pipe respectively linking the vacuum oil tank and an atmospheric part of the gearbox device). An oil pump is arranged and configured to pump oil from the vacuum oil tank e.g. to a main lubricating system of a power generation or compression line. The oil pump is preferably driven by a variable speed electric motor, wherein the speed of the oil pump can be controlled depending on e.g. the level of oil in the vacuum oil tank. At least one vacuum pump is arranged and configured for decreasing atmospheric pressure to a level permitting to reduce the density of the gas surrounding the toothing, e.g. to minimum 50% of ambient atmospheric pressure. The speed (setting parameter) of the vacuum pump is adjusted/adjustable depending on at least one measured or evaluated parameter, especially depending on air leakage due to actual clearances existing between the input or output shafts and the shaft sealings of the gearbox device (which clearance values may depend on actual power level of the gearbox device, which dependency can optionally be evaluated and processed on context with system control). Preferably, the vacuum pump is cooled and lubricated via the gearbox oil inlet system (which feature can be considered providing for considerably enhanced configuration). The vacuum pump arrangement is preferably equipped with an accelerometer configured to check the vibration parameters of the mechanical parts of the pump, thereby also easing predictive maintenance. The gearbox arrangement further includes at least two automatic valves (normally opened) permitting the vacuum oil tank to act as a siphon when they are closed (switchable siphon function), wherein redundancy of two automatic valves is favourable especially also for safety reasons (thereby preventing opening failure). Preferably, the gearbox arrangement further includes an oil high-pressure system arranged and configured for closing the automatic valves coupled with the vacuum oil tank, wherein the oil high-pressure preferably includes an oil tank, a high-pressure pump and check valves to prevent valve opening when closed. Preferably, the gearbox arrangement further includes at least one automatic valve configured and arranged for adjusting a quantity of (cooling) oil delivered to the gearing/toothing of the gearbox. Preferably, one or two further automatic valves (normally opened) are provided to link an upper part of the vacuum oil tank and an upper part of the gearbox to the atmosphere, respectively. Theses valves are closed under vacuum operation, and they permit the gearbox to return to atmospheric pressure faster, if desired. The gearbox device may include shaft sealings permitting to control air flow entering a/the inner volume of the gearbox especially during vacuum running conditions.

In particular, a/the control unit may control at least one parameter relating to at least one of the following operational conditions which can be monitored by appropriate sensors, wherein the latter can be implemented by the skilled person according to individual preferences: oil level (sensor), vacuum level (sensor), speed/power level (sensor) as well as oil temperature (sensor) and vacuum pump temperature (sensor), valve position (sensor), temperature of electric motor(s) especially of involved pumps.

The control unit may also provide for a user interface, e.g. a tactile screen (human-machine interface). The control unit may also control/manage any operation in case of electric micro cuts or black outs, and also normal start/stop sequences as well as emergency stop sequences. In particular, based on the sensor data provided by the sensor unit, (re)start sequence can be rendered more efficient and more secure. The control unit may also communicate with any further unit of any further system components (of the present arrangement and/or of any further plant). The control unit may also comprise the following functionality: predicting or predefining opening/actuation time of automatic valves, predefining preventive maintenance especially on vacuum pump(s) and automatic valves, adjusting setting parameters, provision of access to the setting parameters and to a/the program especially via login and password.

In particular, the control unit can be preset to control at least some or all of the following parameters/data: oil level in oil tank (regulation and alarms), vacuum level in gearbox and upper part of oil tank, (minimum) speed of the oil pump and vacuum pump, position of the automatic valves (opened/closed), temperature of the vacuum pump, temperature of the electric motors of the oil and vacuum pumps, position of the automatic valve to control the oil flow permitting to cool down the teeth of the gearbox (opened or partly closed);

The control unit (resp. an automatic unit exhibiting similar functionality) also allows for:

- interfacing with the user via a tactile screen (human-machine interface);
- managing plant electric micro cuts or black out at a high level of security and efficiency (e.g. for short duration of micro cuts, an energy storage unit permits the control unit not to shut down but to initiate an automatic restart sequence; for long durations, the control unit may automatically reset to put at least the vacuum system in safe configuration);
- communicating (e.g. by means of a wireless communication module) with a further automat/control unit controlling further components of the plant;
- controlling normal start stop sequence as well as emergency stop sequence;
- recording and storing of main parameters of the system;
- checking time opening of the automatic valves;
- preventive maintenance on vacuum pump as well as automatic valves;
- easily adjusting setting parameters;
- accessing setting parameters and respective computer program via login and password.

Thus, the present invention also allows for easily implementing the following functionality:

- reducing power (electrical) consumption especially based on adjustment of the vacuum pump's speed/power level, especially depending on real (actual, effective, momentary) air flow passing through the gearbox resp. via its shaft sealing system;
- reducing oil quantity applied to the toothing to minimum needs, especially based on appropriate actuation of at least one automatic valve under (partial) vacuum conditions, especially in order to prevent an increase in oil flow due to an increase of overall oil pressure relative to the atmospheric pressure;
- avoiding use/requirement of thermal expansion compensators placed on pipes connecting the gearbox to the vacuum oil tank and vice and versa, especially by providing short length of pipes to ensure any thermal expansion being considerably reduced to a minimum, thereby consequently reducing any forces evoked on the flanges;
- safely running/operating even in case of electric micro cuts or black outs;
- predictive maintenance control especially based on resetting initial plant parameters and checking time opening of (main) valves;
- increased maintenance interval for the vacuum pump(s), especially based on the concept of renewing oil of the vacuum pump(s) via a/the lubricating system of the gearbox (thereby also reducing any particles contaminating the oil), wherein checking the degree of damage of different mechanical parts of the vacuum pump can be performed by an accelerometer, thereby allowing to increase maintenance interval from e.g. 2.500 hours to more than 32.000 hours;
- retracing events especially in context with predefining conditions for an emergency stop, especially based on recording and monitoring/analysing of the main parameters of the system, thereby reducing required time to run an examination/investigation of the system, and thereby also limiting the need of any technicians on site searching for any failure and also limiting any requirements to dismount any components;

It has been found that in an embedded configuration, the components of the present gearbox arrangement consume at least factor ½ less electrical power to realize the same vacuum level as compared to a standalone configuration. In an embedded configuration, vacuum in the gearbox is realized only in the vicinity of the toothing as compared to vacuum in the whole gearbox of a standalone configuration. It should be mentioned that a standalone configuration is preferably dedicated to any type of gearbox which is not initially designed to run under vacuum. Thus, the present invention provides for a concept which can be implemented in view of high efficiency for both kinds of systems (embedded and stand-alone).

Personified terms, to the extent that they are not formulated here in the neuter, may refer to all genders within the scope of the present disclosure. Any English-language terms or abbreviations used herein are customary industry terms and are familiar to the skilled person in the English language.

In previous gearbox systems the achievable level of efficiency was lower, and the functionality provided by the prevent invention only could be implemented partially and based on relatively high effort. In particular, referring to the teaching of WO 2003/074903 A2, the following characteristics can be mentioned: a first and a second buffering oil tank are provided, wherein the second tank ensures a kind of manifold function centralizing the oil flow coming from the first tank and the oil pump; thermal compensators are provided for compensating any thermal expansion of connecting pipes between the gearbox and the oil tanks and further components of the lubricating system; a bypass allows for transfer of oil from the gearbox to the (external) lubricating system, especially in case of maintenance operations on the first and second oil tanks or any other component connected thereto; the vacuum pump is operated at fixed speed/power level and is cooled via an external cooling system, and an air/oil separator as well as a further filter are provided upstream of the vacuum pump; the piping driving air to the vacuum pump or refeeding oil to the lubricating system is equipped with oil drains; valves at the oil tank(s) are configured to be opened manually (e.g. via hand wheel (see items G); an oil medium-pressure system is provided for actuating/close the previously mentioned valves, wherein this oil medium-pressure system contains an oil tank, a pump and check valves to prevent valve opening when closed (relatively large valve actuators); most of the valves are energized via pressurized air.

In contrast, the present invention provides for the technical teaching of efficiently and effectively controlling the operational state of at least the vacuum pump and of controlling at least one oil flow (especially depending on actual vacuum level and/or depending on air leakage). Also, there is no need for a bypass or for any thermal compensators. Thus, the inventive concept also allows for a quite slim design of the gearbox arrangement. Not least, it should be mentioned that the present invention also allows for considerable power/energy saving especially in context with control (resp. feedback control) of the power level of the vacuum pump. In particular, the vacuum pump's power level is adjusted as low as possible in order to ensure for a predefined vacuum level e.g. in dependence on actual air leakage to the gearbox. For example, the vacuum pump is a volumetric vacuum pump.

According to one embodiment the vacuum pump is communicating with the inner volume (partial vacuum area) of the gearbox device via the vacuum oil tank, especially by means of a suction pipe (second pipe) directly coupling the vacuum pump and the oil tank, preferably without any intermediary filter or filtering process (wherein the oil tank is preferably directly coupled to the gearbox device via a first suction pipe, preferably without any intermediary filter or filtering process). This kind of connecting and linking also favours a slim design and advantageous control options.

According to one embodiment the plurality of valves comprises at least one automatic valve configured for (directly) linking the oil tank back to the gearbox device (especially to the volume encased by gearbox housing) in an open state and for ensuring said siphon function in a closed state, preferably at least two automatic valves in redundant arrangement respectively configured for ensuring said siphon function respectively in a closed state. This at least one automatic valve also provides for enhanced controllability and security.

It should be mentioned that the inventive concept allows for providing oil flow to/via the gearbox device at high level of security. Regularly, the at least two automatic valves are in a closed state (vacuum operation). Preferably, the at least two automatic valves in redundant arrangement are provided in parallel at two pipes (especially sixth pipe and seventh pipe, as described herein).

The present invention allows for preventive maintenance and monitoring, wherein a maintenance procedure can be initiated e.g. by the two following steps or depending on the two following conditions: opening of at least one automatic valve, exceeding a predefined level of the value measured by at least one accelerometer connected to the vacuum pump.

According to one embodiment the selectable/switchable siphon arrangement is selectable/switchable by means of at least one automatic valve arranged on at least one atmospheric coupling pipe of the piping connecting the oil tank and the gearbox device (especially the volume encased by gearbox housing), preferably at least two automatic valves in redundant arrangement on the respective redundant atmospheric coupling pipe. This also facilitates switching from vacuum operation to atmospheric operation.

According to the present disclosure, the functional wording "atmospheric coupling pipe" emphasizes on the fact that this kind of piping is provided for redundancy and high level of security in context with "normal" modes of operation and in order to allow for a change in oil flow path when partial vacuum is applied.

It should be mentioned that the present invention allows for dispensing a bypass, e.g. in context with maintenance requirements; in other words: there is no need for providing supplemental piping bypassing the vacuum oil tank. Nonetheless, one embodiment may optionally provide for a bypass also, for example with at least one first automatic valve being arranged on a/the atmospheric coupling pipe and a second automatic valve being arranged on a bypass.

According to one embodiment the gearbox arrangement exhibits an inner volume defined by a/the inner gearbox housing, wherein shaft sealings prevent air entering the inner volume, wherein the vacuum pump communicates with said inner volume via the vacuum oil tank according to at least one mode of operation. This also allows for favourable oil flow both via the gearbox inner volume (partial vacuum) and via the volume encased by the gearbox housing (at least approximately atmospheric conditions), especially in context with oil flow (back to the main lube oil tank) exclusively driven by gravity.

According to one embodiment the gearbox arrangement is configured for self-adjusting a/the power setting of the vacuum pump depending on actual sensor data of the at least one sensor such that a predefined vacuum level is ensured both within the inner volume (partial vacuum cavity) and within the vacuum oil tank, especially depending on both actual pressure data and air leakage data. This concept also allows for accumulating oil which can be refed to the gearbox by means of a slimline design. Preferably, the control can be carried out based on (at least) vacuum level data. Control can advantageously be carried out via resp. by means of a/the speed controller of a/the electric motor.

It should be mentioned that actual air leakage data can (optionally) be provided both by a specific sensor arrangement and by at least one parameter deducted from further sensor data. For example, actual air leakage data is correlated with actual performance (level) of the gearbox device (e.g. speed of rotation resp. power stage). For example, when the gearbox oil outlet temperature exceeds a given value or when the vacuum pump speed is running below a given/predefined value or threshold (for a predefined/set vacuum level), then the speed of the vacuum pump can be adjusted by a/the control unit, especially to decrease oil outlet temperature or to increase vacuum level. In that context, preferably, feedback control of the vacuum pump's power level can be carried out based on actual pressure data and optionally also based on air leakage data referring to actual air leakage.

According to one embodiment the gearbox arrangement is configured for ensuring a pressure (resp. gas density) within the inner volume (partial vacuum cavity) which is reduced by at least 50% as compared to ambient atmospheric pressure (e.g. reduced by at least 500 mbara as compared to 1 bara). This level of partial vacuum should be considered being an example only; the skilled person may implement the present invention in context with individual partial vacuum levels which may be chosen considerably lower also.

According to one embodiment the gearbox device comprises at least one shaft sealing preventing air entering a/the inner gearbox housing, wherein the gearbox arrangement is configured for controlling the power setting (especially the speed) of the vacuum pump depending on actual sensor data (air leakage data) related to an actual amount of air flow entering the gearbox device especially via the at least one shaft sealing. This also allows for controlling or at least monitoring correct efficient functioning of the vacuum system. In particular, for each individual gearbox arrangement, experience values correlating a specific vacuum level or specific speed of the vacuum pump and an air leakage parameter allow for controlling or at least monitoring correct functioning of the system, e.g. in context with fault diagnosis.

It should be mentioned that vacuum level parameter preferably is a parameter based on data measured momentarily, and power setting (especially the speed) of the vacuum pump preferably is a control parameter.

According to one embodiment the gearbox arrangement further comprises an oil high-pressure system configured for actuating at least some of the valves, especially at least one automatic valve correlated with at least one atmospheric coupling pipe of the piping connecting the oil tank and the gearbox device (especially to the volume encased by gearbox housing), wherein the oil high-pressure system includes a further oil pump (high-pressure oil pump) and preferably comprises a plurality of check valves configured for preventing valve opening. This configuration also provides for a high level of system security, especially involving at least two automatic valves arranged in parallel on two (redundant) atmospheric coupling pipes.

According to one embodiment the oil pump is connected and configured for providing oil from the vacuum oil tank to a lubricating system of the gearbox arrangement (power generation and/or compression line); wherein the gearbox arrangement is configured for self-adjusting a/the power setting of the oil pump depending on actual oil sensor data, especially depending on an actual level of oil within the vacuum oil tank. This configuration also provides for further energetic improvements also in context with further components of the gearbox arrangement.

According to one embodiment the oil pump is independent from a/the main lube oil tank of the gearbox device. This independency also allows for a high degree of processual variability. In particular, for one of several modes of operation of the gearbox arrangement, the oil pump is operated for providing oil from the vacuum oil tank directly to the gearbox (especially to the volume encased by a/the gearbox housing or casing).

According to one embodiment the oil pump is arranged and configured for providing oil via the gearbox device to an oil outlet pipe for oil flow driven by gravity from the gearbox device back to a/the main lube oil tank. This arrangement also allows for favourable implementation in many standard piping arrangements comprising oil refeed to the main lube oil tank (exclusively) driven by gravity.

According to one embodiment the piping connecting the oil tank and the gearbox device at least comprises the following pipes: suction pipe connecting the gearbox inner volume (partial vacuum area) and the oil tank (first pipe), oil pipe connecting the vacuum oil tank and the oil pump and the gearbox device (third pipe), at least one atmospheric coupling pipe directly connecting the oil tank and the gearbox device (sixth pipe and/or seventh pipe). This configuration allows both for a slimline design and high security, and also for variability.

According to one embodiment the plurality of valves at least comprises the following automatic valves: at least one automatic valve arranged on an atmospheric coupling pipe directly connecting the oil tank and the gearbox device (preferably at least two automatic valves in redundant arrangement respectively configured for ensuring said siphon function respectively in a closed state), at least one automatic valve respectively linking an upper part of the oil tank and an upper part of the gearbox device to the atmosphere (vent). This allows for easily controlling main operating functions in context with both vacuum operation and atmospheric operation by means of automatic valves.

According to one embodiment the plurality of valves at least also comprises at least one automatic valve adjusting the quantity of oil delivered to cool the gearing/toothing of the gearbox (and arranged on an oil feeding pipe connecting the gearbox device to a main oil tank supplying oil to the gearing). It should be noted that this valve preferably be configured such that in case of any lack of energy the valve is fully opened.

According to one embodiment the plurality of valves at least comprises one automatic valve arranged on a/the (respective) atmospheric coupling pipe connecting the oil tank and the gearbox device, and one automatic valve arranged on a/the pipe linking the oil tank to the atmosphere.

This also provides for performance-related controllability of cooling medium, respectively.

According to one embodiment the vacuum pump is equipped with an acceleration sensor, wherein the vacuum pump is controlled depending on sensor data of the acceleration sensor. This specifically improves monitoring/control of the vacuum pump and also contributes to improved maintenance efficiency.

According to one embodiment the vacuum pump is cooled and/or lubricated via a/the oil circulation of the gearbox arrangement, especially via a/the oil circulation (oil inlet system) of the gearbox device, especially via a separate oil suction/feeding pipe (fourth pipe preferably directly connecting the gearbox device and the vacuum pump) and a separate oil refeeding pipe (fifth pipe preferably directly refeeding from the vacuum pump to the gearbox device or to a refeed resp. refeeding pipe from the oil tank to the gearbox device). It has been found that such cooling of the vacuum pump may increase pump life cycle and may also increase maintenance interval duration at least by factor 5 or even more than factor 10. This configuration also improves processual interlacing and allows for synergetic effects.

According to one embodiment an exhaust pipe from the vacuum pump is linked to the gearbox, at least indirectly via a/the atmospheric coupling pipe. This may further improve the functionality, especially also based on a holistic view also taking into account environmental requirements.

According to one embodiment the gearbox arrangement is configured for providing oil from the vacuum oil tank also for cooling a/the gearing/toothing of the gearbox device and/or to lubricate at least the gearbox device and/or to lubricate further components of the gearbox arrangement, especially by means of an additional piping to a lubrication system. This variability further improves synergetic implementation of the present invention in context with further components of the gearbox arrangement, thereby providing an even more broad/extensive concept considering multiple aspects and conditions for efficient sustainable operation (control) of gearbox systems.

It should be mentioned that the inventive concept also allows for easily implementing improvements in context with redirecting air flow; in particular, the vacuum pump's exhaust pipe is redirected to the lubrication system, which configuration allows for preventing emissions to the environment.

According to one embodiment the gearbox arrangement is configured for both embedded and stand-alone implementation of the vacuum and oil pumping components. This variability allows for implementation of the present invention in context with many different kinds of arrangements.

According to one embodiment at least the vacuum components and optionally also the oil pumping components are embedded into the gearbox device. This further improves slim design and compactness and also allows for high cost efficiency.

According to one embodiment at least the vacuum components are provided in a stand-alone configuration providing for a bypass permitting maintenance, especially of the oil pump, irrespective of an operating state of the gearbox device. This optional configuration may be implemented in specific constellations requiring relatively high maintenance effort. The present invention provides for a concept which allows for easily adapting an embedded design or a stand-alone configuration.

According to one embodiment the sensor unit comprises at least one accelerometer and is configured to measure at least one vibration parameter especially of mechanical parts of at least the vacuum pump. This allows for further improving monitoring and control, especially in context with predictive maintenance.

According to one embodiment the control unit is configured for self-controlling a (re) start process of the gearbox arrangement especially in context with maintenance or stoppage of at least one of the components of the gearbox arrangement, wherein the gearbox arrangement preferably comprises an energy storage unit configured for providing energy to the gearbox arrangement e.g. in case of power blackout. This may considerably improve system readiness and self-control. Such restart function also allows for saving time in context with re-initializing system parameters. Preferably, the control unit is configured for status monitoring of the components of the gearbox arrangement, especially based on incremental storage of critical data e.g. relating to performance or maintenance status. Incremental storage is carried out e.g. for a period of one week or one month, wherein once this period has lapsed, the data is stored by overwriting previous (older) data. This also allows for a safe and slim monitoring process, and this facilitates checking parameter correctness, and this also facilitates maintenance and service.

According to one embodiment the gearbox arrangement is configured for controlling at least the following two kinds of oil flow to the gearbox device: oil flow to the toothing, oil flow to at least one bearing of the gearbox device. This allows for rendering the control even more specific, especially by correlating the manner of controlling oil flow with the manner of controlling the at least one vacuum pump. Control of these two kinds of oil flow can be carried out independently or in a manner dependent on each other.

One aspect of the invention relates to methods resp. processes allowing for easily realizing the advantages as described above.

In particular, the above mentioned object is therefore also solved by a method of providing and maintaining partial vacuum within at least one gearbox device in a gearbox arrangement, especially within a high efficiency turbo gearbox device, wherein a vacuum pump communicates with an inner volume (partial vacuum cavity) of the gearbox device via a vacuum oil tank, wherein an oil pump coupled to the vacuum oil tank provides for coupling oil flow to the gearbox device and optionally also to a lubricating piping, wherein a control unit controls at least the vacuum pump and the oil pump respectively depending on actual sensor data of a sensor unit comprising at least one sensor related to pressure (vacuum level), temperature and/or oil level, wherein the vacuum oil tank and at least one automatic valve provide for a selectable/switchable siphon arrangement such that a predefined/predefinable vacuum level is ensured within the inner volume (partial vacuum area) by means of the vacuum pump and via the vacuum oil tank, wherein the predefined/predefinable vacuum level is controlled by controlling the vacuum pump depending on actual sensor data of the at least one sensor, the sensor data comprising at least one of the following types of data: pressure sensor data related to a/the vacuum level within the inner volume (partial vacuum cavity), air leakage sensor data related to the gearbox device. This also ensures improvements in operating status and in control functionality. In particular, such a method provides for the advantages as described above in context with the gearbox arrangement.

According to one embodiment at least one automatic valve is actuated for (directly) linking the oil tank back to the gearbox device in an open state and for ensuring said siphon function in a closed state, thereby selecting/switching the siphon arrangement. This also provides for favourable control options in conjunction with slimline design, especially without the need of any supplemental bypass.

According to one embodiment an actuation parameter of the at least one automatic valve is monitored, especially the opening/closing time required for actuating the at least one automatic valve. It has been found that in certain constellations, required opening/closing time of the at least one automatic valve may be considered a critical parameter (e.g., while the oil pump is stopped, especially in context with bull gear functioning). By monitoring and predicting that parameter, the present invention provides for an even more robust process and system.

According to one embodiment a/the power setting of the vacuum pump, especially the speed of rotation, is self-adjusted depending on actual sensor data of the at least one sensor such that a predefined vacuum level is ensured both within the inner volume (partial vacuum cavity) and within the oil tank, especially depending on both actual pressure data and air leakage data. This also improves energetic efficiency of involved components and may also extend lifetime.

According to one embodiment the pressure (resp. gas density) within the inner volume (partial vacuum cavity) is reduced by at least 50% as compared to ambient atmospheric pressure (e.g. 500 mbara as compared to 1 bara). This vacuum level is mentioned as an example only; the skilled person is able to adjust the desired (predefinable) vacuum level depending on individual gearbox arrangements.

According to one embodiment at least one of the following parameters is controlled: oil level in vacuum oil tank, vacuum level within inner volume (partial vacuum area) of the gearbox device and within an upper part of vacuum oil tank, speed/power setting of the vacuum pump, speed/power setting of the oil pump, valve position of automatic valves controlling the manner of coupling oil flow from the vacuum oil tank via the gearbox device to a/the main lube oil tank, temperatures of the vacuum pump, temperature of electric motors of the oil pump and of the vacuum pump, position of automatic valve controlling the oil flow cooling the gearing/toothing. These parameters/data provide for large data basis for further improvements in context with efficiency, control and maintenance.

According to one embodiment at least one vibration parameter especially of mechanical parts of at least the vacuum pump of the gearbox arrangement is measured by at least one accelerometer, especially in context with predictive maintenance. This further improves monitoring and control of system parameters and allows for sustainable use of involved components based on efficient maintenance actions.

According to one embodiment at least an oil flow to the toothing of the gearbox device is controlled depending on actual vacuum level, and optionally also at least one further kind of oil flow is controlled, especially an oil flow to at least one bearing of the gearbox device. This also allows for further efficiency improvements as well as more specific operating conditions.

One aspect of the invention relates to a computer program and to a computer-implemented method providing for above mentioned advantages, wherein the control of at least the vacuum pump is carried out by the computer-implemented method. In other words: at least some of the advantages described above can be realized by implementing the control functionality described herein, i.e., by use of a computer program providing this control functionality at least in context with operation of the vacuum pump and operating the siphon arrangement including the at least one automatic valve.

Abstract: The present invention relates to gearbox arrangements exhibiting at least one (turbo) gearbox device and configured for providing partial vacuum within the gearbox device and comprising a vacuum pump, a vacuum oil tank, an oil pump coupled to the vacuum oil tank, and a plurality of valves; and comprising a sensor unit and a control unit configured for controlling at least the vacuum pump and the oil pump respectively depending on actual sensor data, wherein the vacuum oil tank and at least one of the valves provide for a switchable siphon arrangement such that a predefinable vacuum level is ensured within the inner volume (partial vacuum area) by means of the vacuum pump and via the vacuum oil tank and by controlling the vacuum pump depending on actual sensor data. The present invention further relates to methods of providing and maintaining partial vacuum by means of such gearbox arrangements.

BRIEF DESCRIPTION OF FIGURES

These and other aspects of the present invention will also be apparent from and elucidated with reference to the embodiments described hereinafter. Individual features disclosed in the embodiments can constitute alone or in combination an aspect of the present invention. Features of the different embodiments can be carried over from one embodiment to another embodiment. In the drawings:

FIG. 3 shows in a perspective view a gearbox arrangement according to one embodiment (stand-alone implementation);

FIG. 5 shows steps of a process according to embodiments;

FIGS. 9A, 9B, 9C respectively show in schematic illustration a gearbox arrangement according to embodiments;

DETAILED DESCRIPTION OF FIGURES

Figure 1A:
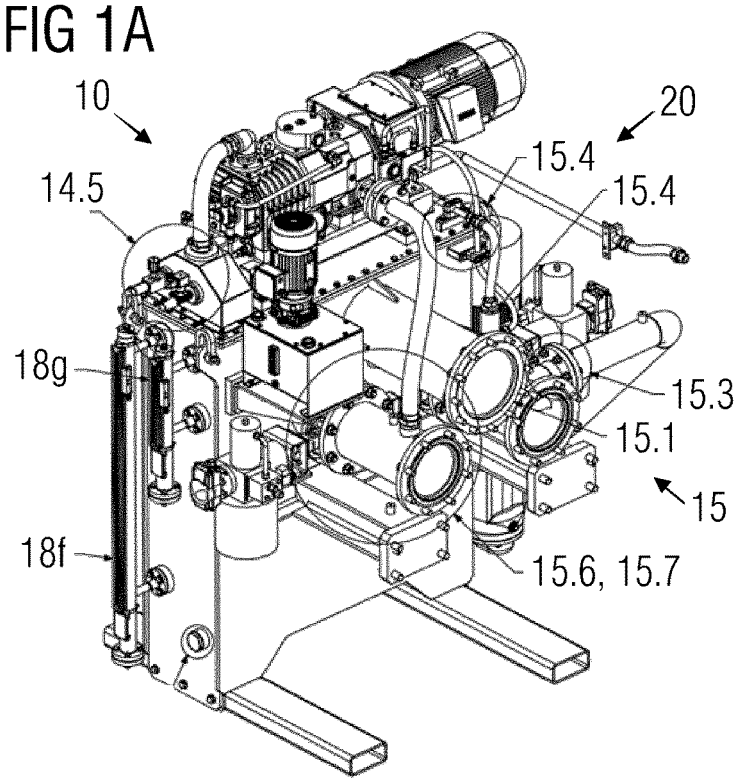
FIGS. 1A, 1B, 1C show in perspective views a gearbox arrangement according to one embodiment (embedded implementation)

First, the reference signs are described in general terms; individual reference is made in connection with respective figures.

Usually, a gearbox 4 is arranged between a driving machine 2 and a driven machine 6. These components are connected to a main oil tank 1 by means of main oil inlet pipe(s) 1*b*, and a main lube oil pump 1*a* provides for oil flow. Recirculation to the main oil tank 1 can be realized via oil outlet pipe 1*c* (driven machine), oil outlet pipe 1*d* (gearbox) and oil outlet pipe 1*e* (driving machine). Usually, the main oil tank 1 exhibits an oil vapour fan extractor 1*f* as well as a vapour filter 1*g*.

The gearbox 4 comprises at least one pinion 4*a* and at least one wheel 4*b* (toothing), wherein a/the shaft 4.1 linking the driving machine to the gearbox and a/the shaft 4.2 linking the gearbox to the driven machine are sealed by means of sealings 4*c*, 4*d*.

A fixed speed vacuum pump 5 allows for providing partial vacuum to the gearbox via an oil tank 7, wherein a valve 7*a* for isolation (maintenance) and at least one heat expansion joint 7*b* arranged on a/the inlet pipe 7.1 allow for bypassing this (first) oil tank 7 and also further vacuum components. The oil tank 7 is equipped with an air intake 7*c* (for breathing air) having an automatic valve. A bypass line 9*e* allows for recirculation of oil flow to the main lube oil tank 1 based on gravity (especially exclusively based on gravity), wherein the bypass line is equipped with an automatic valve 7*d*. A main oil pump 8 is arranged downstream from the (first) oil tank 7. This arrangement further comprises an intermediate oil tank 9 and at least one heat expansion joint 9*a*. An automatic valve 7*e* arranged between the two tanks 7, 9 allows for providing vacuum to the tank and the gearbox only. This arrangement further comprises a valve 9*b* for isolation (maintenance) which is arranged downstream of the intermediate oil tank 9. An air/oil filter 9*c* is arranged upstream from the vacuum pump 5 and connected to the intermediate oil tank 9. This arrangement further comprises a pipe 9*d* connecting both the intermediate oil tank 9 and the bypass line 9*e* to the main lubricating system resp. to the main lube oil tank 1. Interaction resp. collaboration of these components can be managed by means of at least one electrical and instrumentation device 3.

Based thereon, the present invention provides for a gearbox arrangement 10 exhibiting a gearbox device 11 having a gearbox housing 11.1 and an inner gearbox housing 11.1*a* accommodating a/the gearing/toothing 11.5, wherein the gearbox housing 11.1 is sealed by means of shaft end sealings 11.3 and the inner gearbox housing 11.1*a* is sealed by means of additional shaft sealings 11.4. The gearbox housing 11.1 encases a volume C11.1, and the inner gearbox housing 11.1*a* encases an inner volume which represents a/the partial vacuum area in vacuum running conditions. A siphon arrangement 20 (including pump, tank, piping, valves) allows for favourable modes of operation in atmospheric and partial vacuum conditions, resp. the siphon arrangement 20 allows for favourable switching between these modes of operation, and also for favourable maintenance procedures. In particular, the siphon arrangement 20 includes a (supplemental) vacuum oil tank 12 (which is different from a main lube oil tank), an oil pump 13 having an oil pump motor 13.1 (especially a variable speed electric motor) and an oil pump inlet 13.3 and an oil pump outlet 13.5, a vacuum pump 14 having a vacuum pump motor 14.1 (variable speed electric motor) and a vacuum pump foot 14.3 and an air intake 14.5. The siphon arrangement 20 further includes at least one of the following piping components 15: first pipe 15.1 (suction pipe connecting the gearbox inner volume and the oil tank), second pipe 15.2 (suction pipe connecting the oil tank and the vacuum pump), third pipe 15.3 (oil pipe connecting oil tank and oil pump and gearbox device), fourth pipe 15.4 (oil suction/feeding pipe connecting the gearbox device and the vacuum pump), fifth pipe 15.5 (oil refeeding pipe connecting the vacuum pump and the gearbox device), sixth pipe 15.6 (first atmospheric coupling between oil tank and gearbox device), seventh pipe 15.7 (second atmospheric coupling between oil tank and gearbox device), eighth pipe 15.8 (exhaust pipe from vacuum pump, e.g. linked to sixth or seventh pipe), ninth pipe 15.9 (connecting main lube oil tank and gearbox housing). The siphon arrangement 20 preferably further includes redundant automatic valves 16, namely a first and a second automatic valve 16a arranged on first/second atmospheric coupling lines, and also at least one automatic valve 16b arranged and configured for linking an upper part of the oil tank and an upper part of the gearbox device to the atmosphere (vent), and also at least one automatic valve 16c arranged and configured for adjusting the quantity of oil delivered to cool the gearing/toothing. A control unit 17 provides for at least one control function especially based on data provided by a sensor unit 18 comprising at least one of the following sensors: pressure sensor 18a (vacuum sensor), acceleration sensor 18b (especially accelerometer checking vibration parameters at least at the vacuum pump), oil level sensor/indicator 18c (especially referring to oil level in vacuum oil tank), air leakage sensor 18d, vacuum cooling system level sensor or indicator 18e especially on vacuum pump, oil level sensor/indicator 18f (especially referring to oil level in vacuum oil tank), oil level indicator 18g correlated with an alarm function.

A lubrication installation 19 provided/managed by a/the plant operator may comprise the main lube oil tank 1, wherein coupling to the gearbox device 11 can be realized e.g. by means of an oil outlet flange 19d.

The gearbox device 11 may further comprise an electric motor 11.7 of a turning gear. Advantageously, the siphon arrangement 20 is provided/arranged within a frame 21 which can be handled e.g. via resp. by means of a plurality of lifting points 23 (force application points).

The gearbox arrangement 10 may further comprise an oil high-pressure system 30 exhibiting a further oil pump 33 (high-pressure oil pump) and at least one check valve 36 configured for actuating a high-pressure line 31.

An intermediate electrical junction device 40 may also provide for accommodation of the control unit 17. The gearbox arrangement 10 may further comprise a switch 50 (coupled to/with the control unit) for measuring the pressure level in the upper part of the tank (pressure probe) resp. for controlling at least one of the modes of operation described herein.

In the following, some features of the present invention are described in more detail with reference to individual figures or examples of embodiments.

FIG. 1A, 1B, 1C and FIG. 2 respectively describe a gearbox arrangement 10 realizing the siphon arrangement 20 in an embedded implementation.

Referring to FIG. 1A, an additional air intake 14.5 is provided for the vacuum pump 14, and the following piping arrangement can be designated in more detail: oil pipe 15.4 to lubricate and cool the vacuum pump connected to the oil tank outlet pipe; oil pipe return 15.3 from main oil pump connected to tank oil return; vacuum pipe inlet resp. oil pipe inlet 15.1 in oil tank (coming from gearbox); oil pipe outlet 15.6, 15.7 from main tank leading to the gearbox device (first and second atmospheric coupling between oil tank and gearbox device). FIG. 1A further shows an oil level sensor/indicator 18f (especially referring to oil level in gearbox) and an oil level indicator 18g correlated with an alarm function.

Figure 1B:
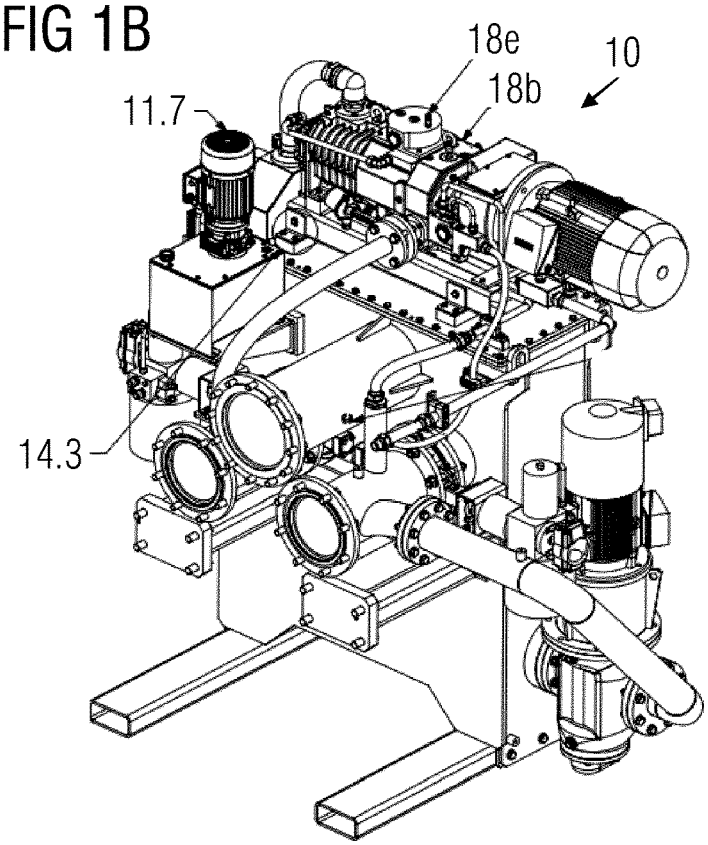

According to FIG. 1B, a/the vacuum cooling system level indicator 18e is provided for/at the vacuum pump. A vacuum pump foot 14.3 ensures the pump's arrangement.

Figure 1C:
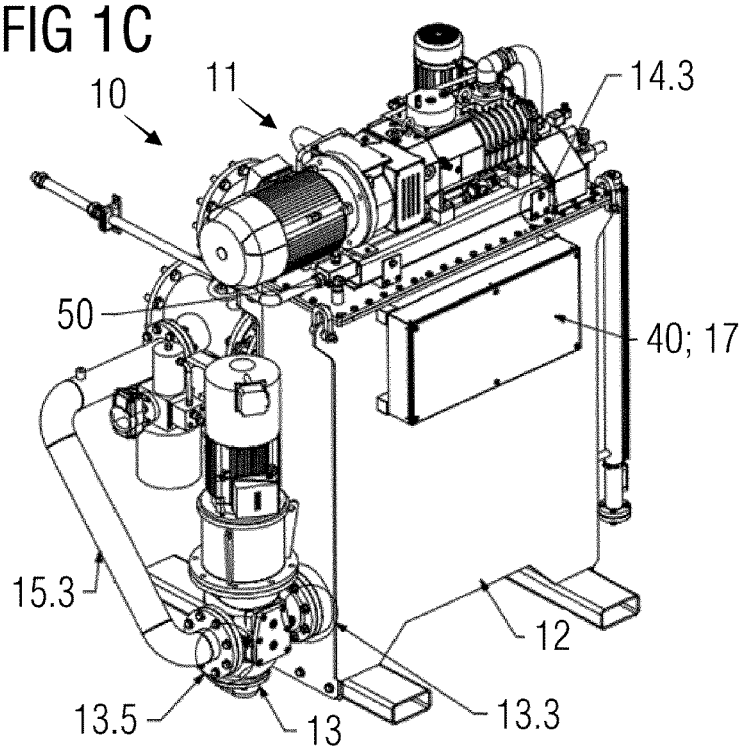

FIG. 1C further shows an oil pump inlet 13.3 and an oil pump outlet 13.5. An intermediate electrical junction device 40 is arranged laterally at the tank 12. According to FIG. 1C, a switch 50 (pressure probe) allows for measuring the pressure level in the upper part of the tank.

Figure 2:
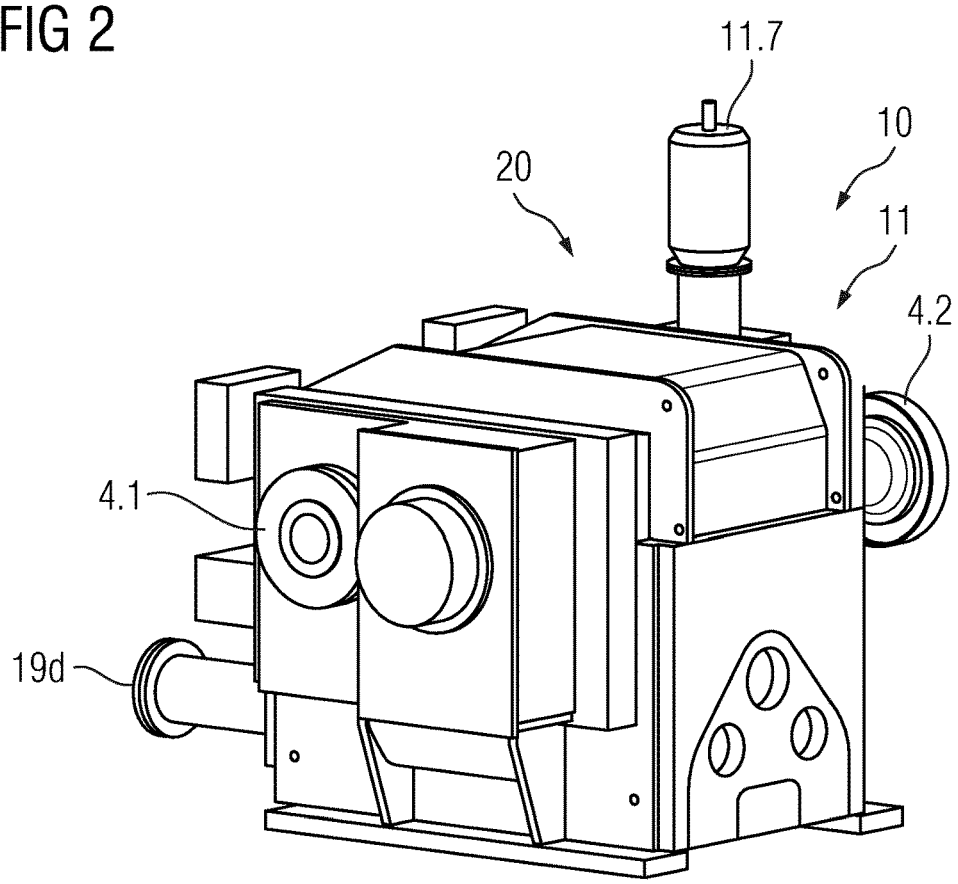
FIG. 2 shows in a perspective view a gearbox arrangement according to one embodiment (embedded implementation)

As shown in FIG. 2, a/the electric motor 11.7 of a turning gear of the gearbox device 11 allows for turning the gear. An oil outlet flange 19d allows for connecting the gearbox device to a specific lubrication installation (especially provided by an operator of a/the plant).

FIG. 3 shows a standalone configuration, wherein the siphon arrangement is provided separate from the gearbox device 11. The siphon arrangement 20 allowing for enhanced efficiency can be provided in a separate frame 21. Lifting points (force application points) 23 allow for handling the siphon arrangement 20 separately.

Figure 4A:
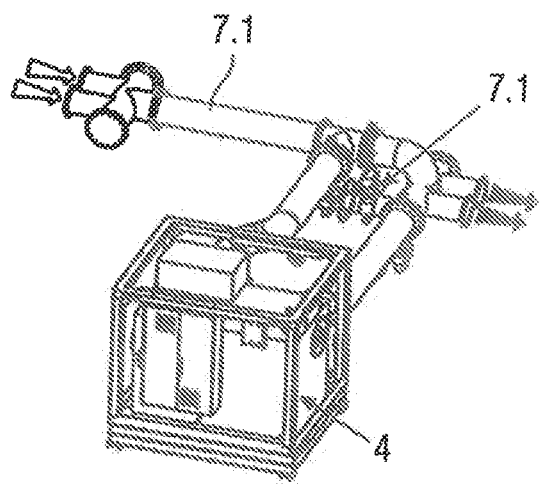
FIGS. 4A, 4B show in a perspective views a gearbox according to prior art (stand-alone implementation)
Figure 4B:
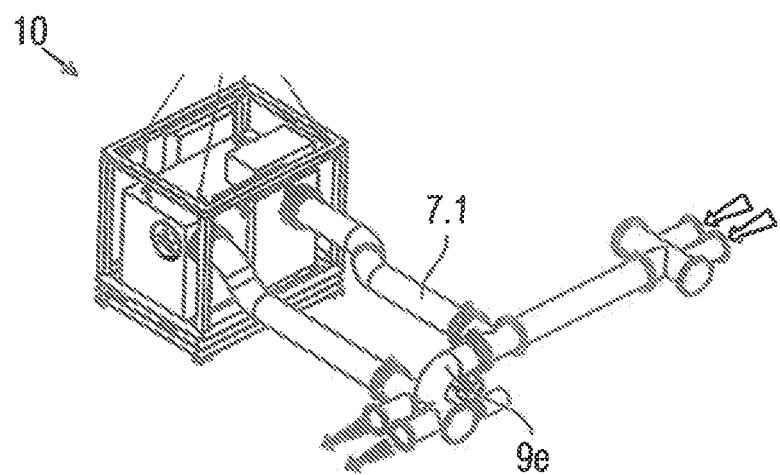

In an arrangement according to FIG. 4A, 4B (prior art), vacuum pump components are provided separate from the gearbox device, wherein a bypass line 9e allows for bypassing the vacuum pump arrangement. Inlet pipe 7.1 of main oil vacuum tank 7 allows for connection to the gearbox. It should be mentioned that an arrangement according to FIG. 4 allows for bypassing the complete unit provided for enhancing efficiency, especially in order to allow for different modes of operation also. Nonetheless, this design has been found to include some drawbacks (especially found out in daily practice), e.g. the need for thermal compensator to accommodate pipe heat extension, the need of a frame supporting the oil tank and further component, the need for hand driven valves to isolate the unit, the need for an intermediate outlet tank upstream from a customer's main oil tank, and the need for an oil/air separator upstream of the vacuum pump. Also, this design requires a large number of automatic valves. Also, there is a need for special piping to evacuate oil condensates prior to feeding the vacuum pump, and the vacuum pump also needs to be cooled via a quite specific device. Not least, there is a need for thermal isolation of the oil tank reducing any risk in context with technicians working on the tank during operation, and also for air cooling to cool down the main electrical installation.

Figure 6:
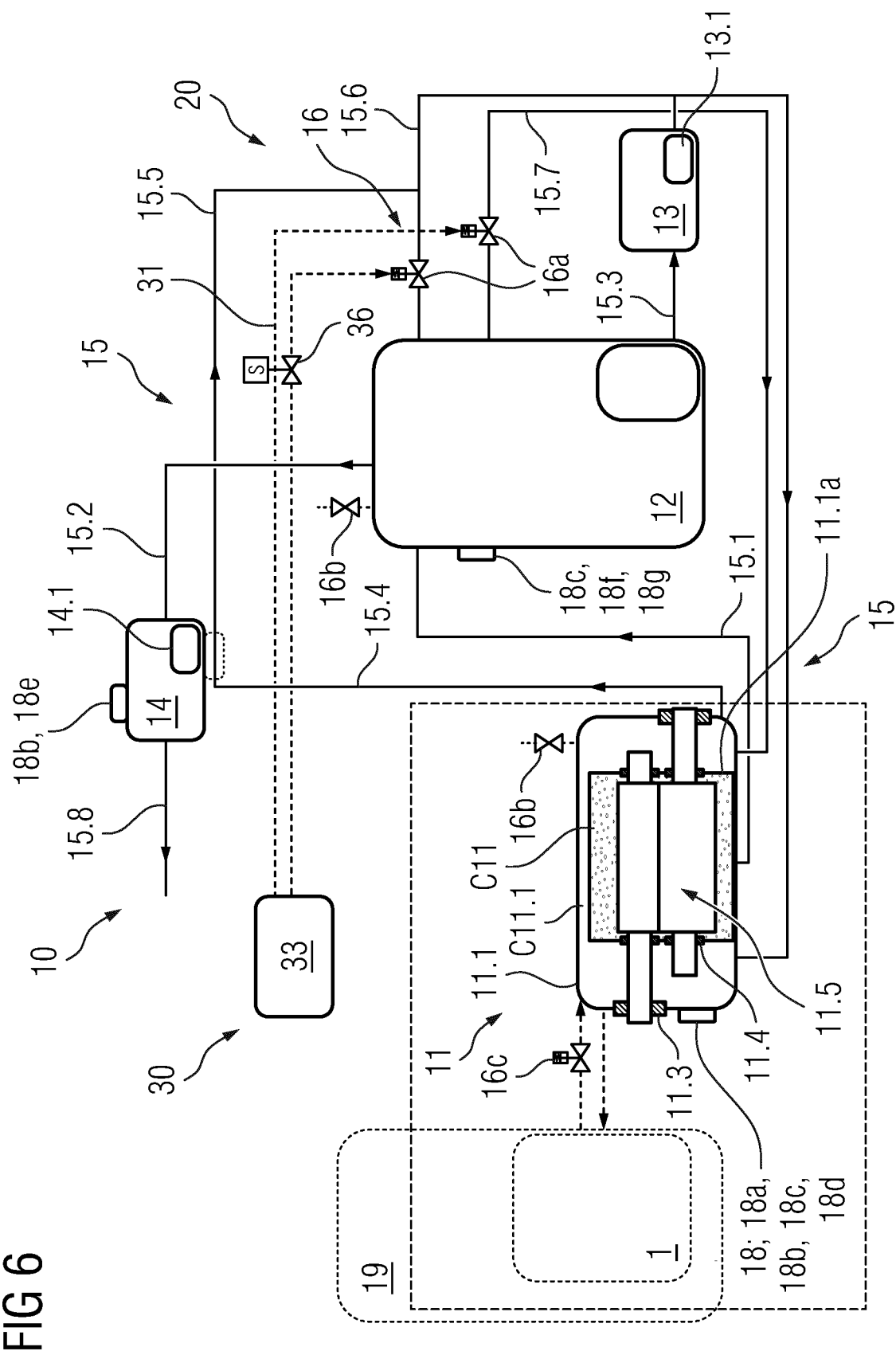
FIG. 6 shows in schematic illustration a gearbox arrangement according to embodiments.

FIG. 5 illustrates steps of a process according to embodiments of the present invention:
  step S1 providing partial vacuum (e.g. 500 mbara) to inner volume of gearbox device, especially via a/the vacuum pump communicating via intermediary vacuum oil tank; step S1 may comprise step S1.1;
  step S1.1 cooling and/or lubricating the vacuum pump via gearbox oil inlet system;
  step S2 controlling at least the vacuum pump and the oil pump respectively depending on actual sensor data; step S2 may comprise steps S2.1 and S2.2;
  step S2.1 providing oil to the gearbox device and optionally also to a lubricating piping;
  step S2.2 controlling oil feed from main oil tank for cooling/lubricating the gearing;
  step S3 selecting/switching the vacuum oil tank in a siphon arrangement;
  step S4 self-adjusting power settings of the vacuum pump and/or oil pump;
  step S5 controlling at least one of the following parameters: oil level, vacuum level, power setting of the pump(s), valve positions, temperature of pump(s) or associated motor(s);
  step S6 actuating at least one valve (vent) at the gearbox and/or oil tank for return to atmospheric pressure/conditions;

FIG. 6 schematically shows a gearbox arrangement 10 including a gearbox device 11 exhibiting a gearbox housing 11.1 and an inner housing 11.1a separating the toothing area (gearing/toothing 11.5) from the bearing area, and providing for the partial vacuum area C11 (which is different from the whole area C11.1 encased by the housing 11.1). Shaft end sealings 11.3 are configured for sealing the gearbox housing 11.1, and shaft sealings 11.4 specifically provide for sealing off the inner gearbox housing 11.1a from atmospheric pressure, thereby providing for controlling/preventing air flow entering the inner housing 11.1a.

A main oil tank (lube oil) 1 is connected to the gearbox via valve 16c to control oil inlet. A (supplemental) vacuum oil tank 12 and an oil pump 13 and a vacuum pump 14 and piping 15 provide for a siphon arrangement, wherein a/the oil pump motor 13.1 and a/the vacuum pump motor 14.1 are both variable speed electric motors. In particular, a first pipe 15.1 is configured as suction pipe connecting the gearbox inner volume and the oil tank, and a second pipe 15.2 is configured as suction pipe connecting the oil tank and the vacuum pump, and a third pipe 15.3 provides for coupling/connecting the oil tank and the oil pump and the gearbox device, and a fourth pipe 15.4 is configured as oil suction/feeding pipe connecting the gearbox device and the vacuum pump, and a fifth pipe 15.5 is configured as oil refeeding pipe connecting the vacuum pump and the gearbox device (or at least the sixth or seventh pipe), a sixth pipe 15.6 is configured as first atmospheric coupling between oil tank 12 and gearbox device 11, and a seventh pipe 15.7 is configured as (redundant) second atmospheric coupling between oil tank 12 and gearbox device 11, and an eighth pipe 15.8 is configured as exhaust pipe from vacuum pump, e.g. linked to sixth or seventh pipe. It should be noted that the respective oil pipe (especially pipes 15.1, 15.2) are configured such that it is not filled with oil completely, thereby allowing the vacuum passing/extending in the top area of the respective pipe.

In particular, the arrangement shown in FIG. 6 is favourable in context with maintenance requirements also while the gearbox is running, e.g. maintenance of vacuum oil tank and/or pumps, wherein any components (permitting maintenance operation while the gearbox is running) used hitherto can be eliminated/renounced.

Figure 7:
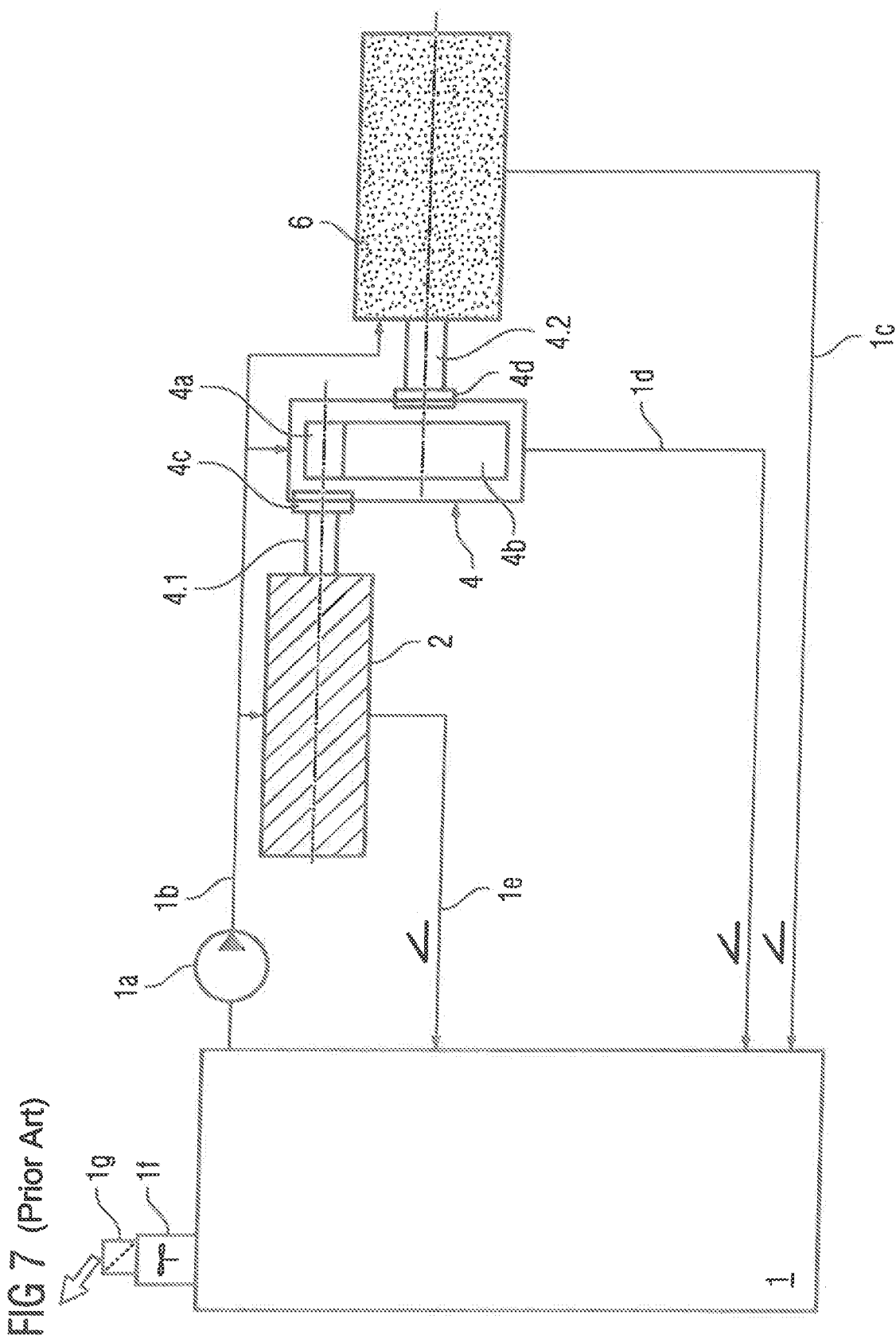
FIG. 7 shows in schematic illustration a gearbox according to prior art.

FIG. 7 illustrates a first arrangement according to prior art, especially comprising the following components: a main lube oil tank 1, a main lube oil pump 1a, a main oil inlet pipe(s) 1b, an oil outlet pipe 1c of a/the driven machine 6, an oil outlet pipe 1d of a/the gearbox, an oil outlet pipe 1e of a/the driving machine 2, an oil vapour fan extractor 1f, a vapour filter 1g, a shaft 4.1 linking the driving machine to the gearbox, a/the gearbox 4, pinion 4a and wheel 4b (gearing), at least one sealing 4c on a high speed shaft section, at least one sealing 4d on a low speed shaft section, and a shaft 4.2 linking the gearbox to the driven machine.

It should be noted that the piping 1c, 1d, 1e is designed to provide oil flow to the main lube oil tank 1 based on gravity (no additional technical driving force, no technical flow driving parameter), which can be a necessary criterion or at least a requirement on the part of a plant operator also in context with the present invention.

Figure 8A:
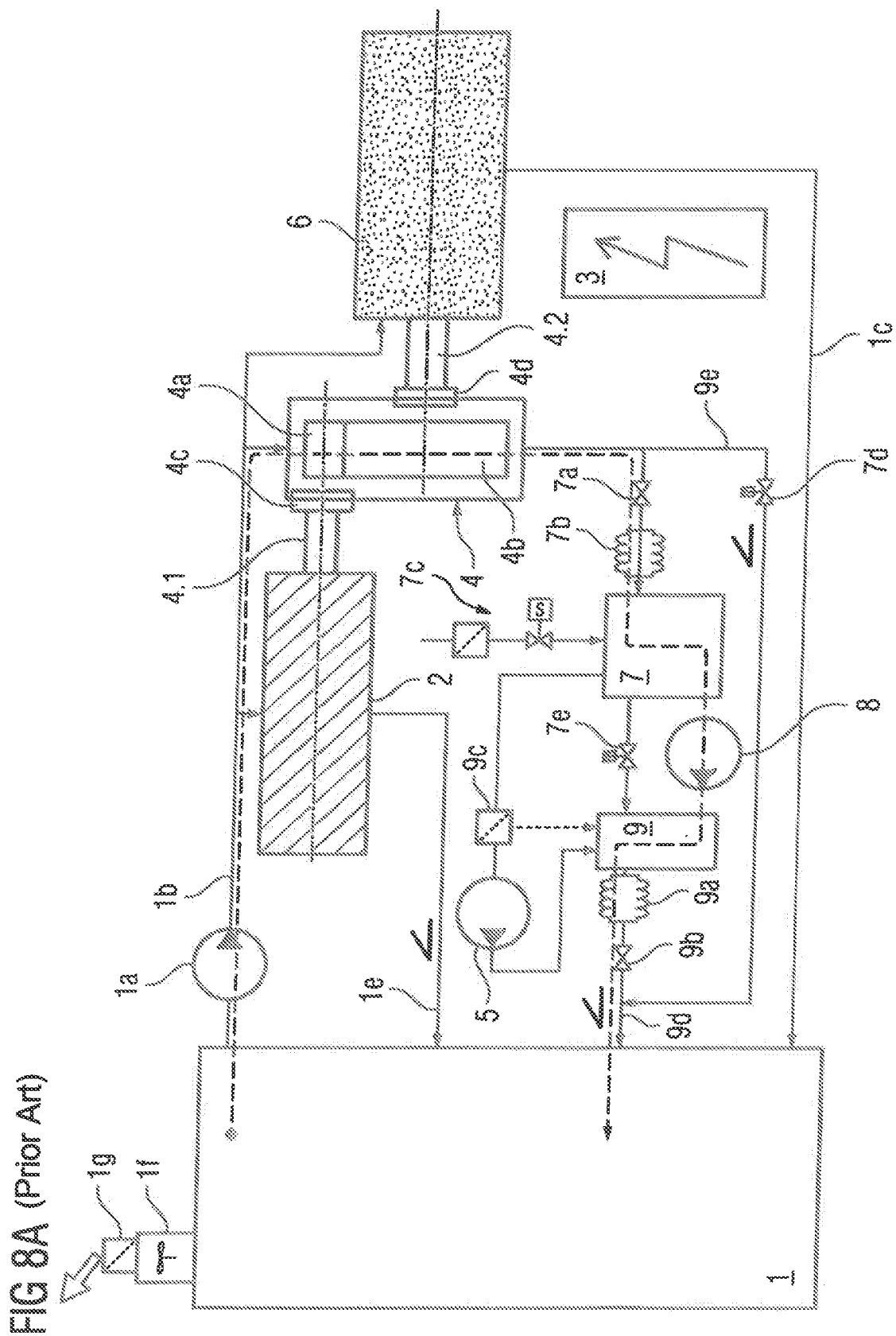
FIGS. 8A, 8B, 8C respectively show in schematic illustration a further gearbox according to prior art.
Figure 8B:
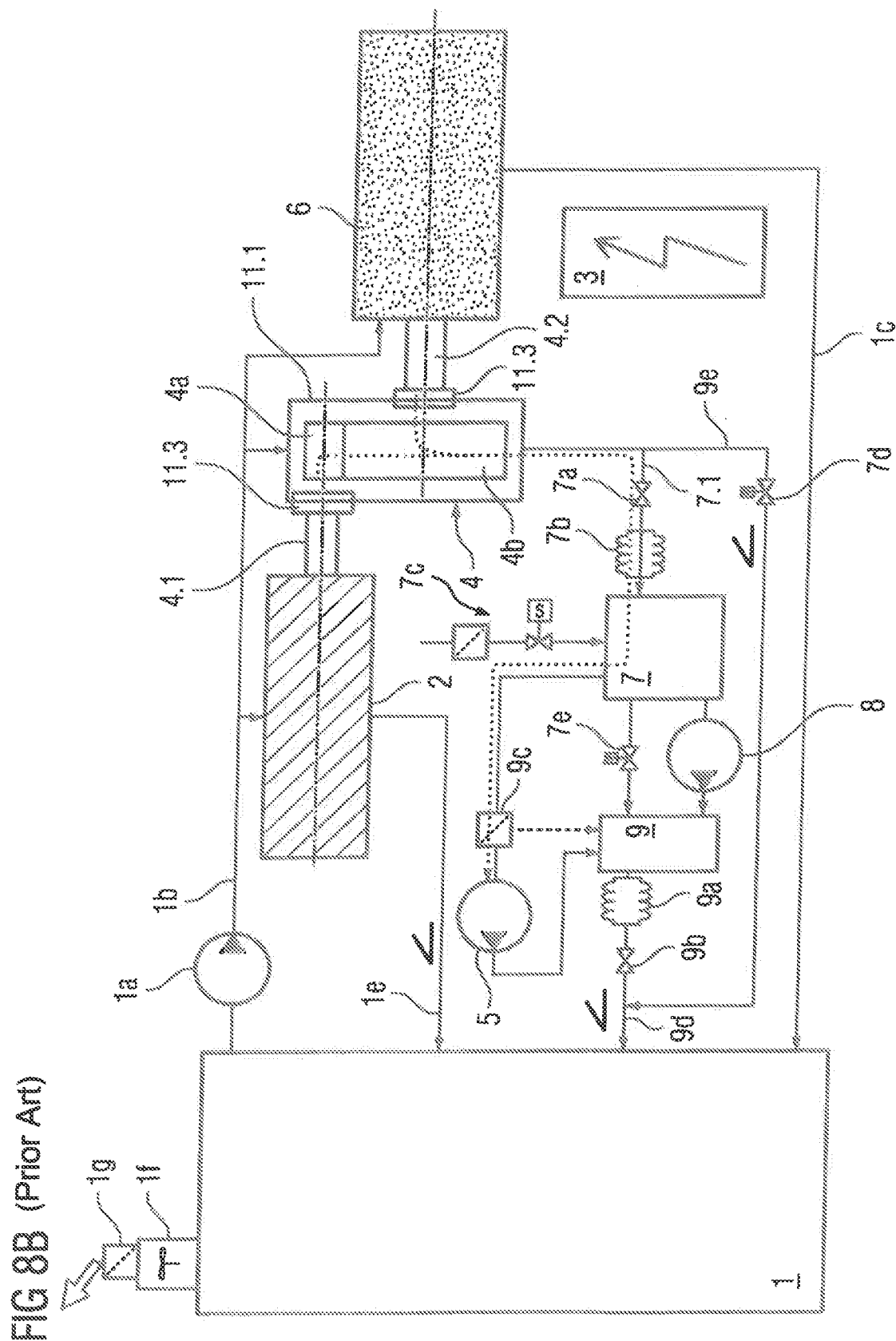
Figure 8C:
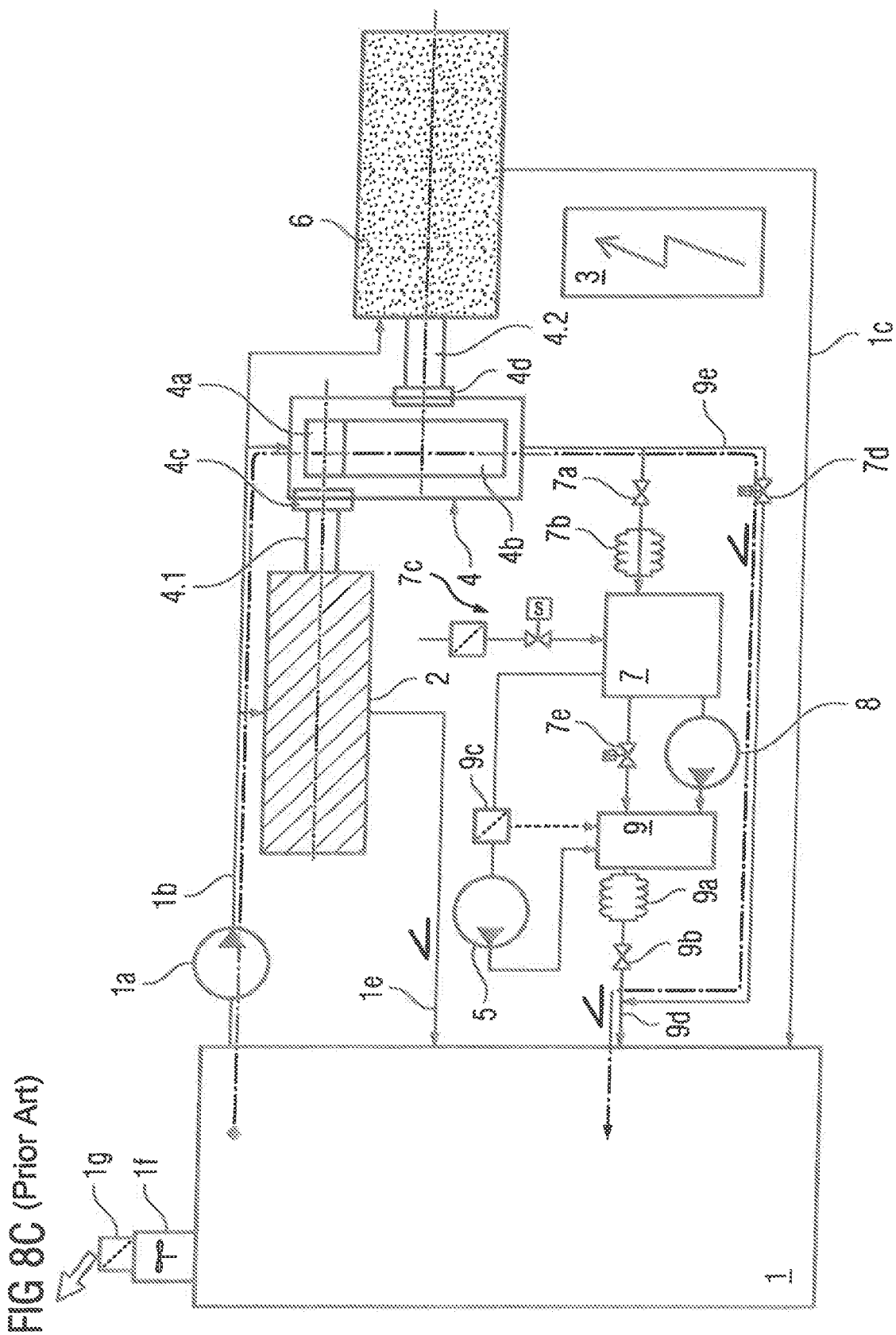

FIG. 8A, 8B, 8C describe a second arrangement according to prior art. In this arrangement, two oil tanks 7, 9 are connected between the gearbox 4 and the main lube oil tank 1, namely an oil tank 7 downstream of the gearbox, and an intermediate oil tank 9 downstream of oil tank 7, wherein a/the vacuum pump 5 and a/the main oil pump 8 are arranged between these tanks 7, 9; the vacuum pump 5 is driven at fixed speed. An air/oil filter 9c is arranged upstream from the vacuum pump 9, including an oil condensate pipe connected to intermediate oil tank 9.

The main oil pump 8 and an automatic valve 7e are provided on the piping between the oil tank 7 and the intermediate oil tank 9, wherein the automatic valve 7e allows for providing vacuum to the oil tank and to the gearbox only. Heat expansion joints 7b, 9a are provided on the piping between the gearbox and the main lube oil tank 1 and connected via valves 7a, 9b for isolation (maintenance). On oil tank 7, an air intake including automatic valve 7c allows for breathing air (including a filter preventing dust from potentially polluting the oil).

The arrangement described in FIG. 8 includes a bypass (bypass line 9e; FIG. 4B, FIG. 8C) allowing for bypassing the oil tank arrangement 7, 9, including an automatic valve 7d. This bypass line leads to pipe 9d which redirects to the main lubricating system (lube oil tank 1). An electrical and instrumentation device 3 is configured to control functioning and interaction of the components shown in FIG. 8 as far as control be required.

In context with oil flow especially at "normal" conditions or maintenance conditions, it should be noted that a/the oil level may not (never) exceed half of the pipes' diameters, therefore, vacuum may flow/spread on upper side of the pipe(s) and tanks (cf. also the respective relative position of the in/out flanges at the tanks 7, 9 in FIGS. 8).

FIG. 8A illustrates a normal oil flow condition resp. a standard operating mode (dashed line); oil flow passes via gearbox 4, oil tank 7, oil pump 8, intermediate oil tank 9 and recirculates to the main tank 1.

FIG. 8B illustrates a vacuum operating mode (dotted line showing the section to which partial vacuum is provided); partial vacuum is generated by vacuum pump 5 and extends to the gearbox volume enclosed by the gearbox housing 11.1.

FIG. 8C illustrates an oil flow condition in context with a maintenance procedure (chain line): oil flow passes via bypass line 9e and circumvents/bypasses the complete arrangement resp. piping provided by oil tank 7, intermediate oil tank 9, vacuum pump 5.

Referring to FIGS. 8, it should be noted that partial vacuum is provided within the section starting from shaft end sealings 11.3 via the oil tank 7 to the point of the vacuum pump 5 (illustrated in FIG. 8B only, by the dotted lines). Oil flow in maintenance conditions is bypassed via line 9e. Therein, the oil flow in normal conditions is illustrated by the dashed line, and the oil flow in maintenance conditions is illustrated by the chain line.

FIG. 9A, 9B, 9C describe a gearbox arrangement 10 according to further embodiments, by referring to main components of the siphon arrangement 20.

In particular, the vacuum oil tank 12 is connected to a/the internal gearbox housing 11.1a separating the bearing area (and respective oil flow) from the toothing area (and respective teeth oil flow), thereby also allowing for isolating the bearings from vacuum and for regrouping a/the bearing oil flow and for using oil flow from main oil pump prior to refeeding to the main lube oil tank 1. It should be noted that this inner housing 11.a provides for a kind of double housing, i.e., a housing specifically surrounding the pinion and the wheel (resp. the gearing/toothing), in addition to the standard housing 11. The vacuum oil tank volume 12 provides for a/the siphon arrangement 20, which can be dedicated (according to one of advantageous implementations) to treat only teeth oil flow. An air intake with automatic valve 7c is coupled to the vacuum oil tank 12. The main oil pump 13 and the vacuum pump 14 are both speed controlled (resp. controllable in power level). Automatic valves 16a provided in redundant arrangement ensure vacuum on vacuum oil tank 12 and gearbox 11 only (especially toothing area only, separate from bearing area). Further, automatic valve 16c controls oil inlet on gearbox, especially depending on the gearbox running under vacuum or not, and/or depending on expected level of performance.

A control unit 17 including instrumentation is configured to control at least the vacuum pump depending on actual sensor data of at least one sensor, the sensor data comprising at least one of the following types of data: pressure sensor data related to a/the vacuum level within the inner volume, air leakage sensor data related to the gearbox device. The sensors can be provided in respective component, e.g. within the gearbox, or in conjunction with the control unit 17. The control unit 17 is further configured to predict maintenance requirements and to record main vacuum process parameters especially on an incremental basis.

It should be mentioned that redundancy of valves 16a and respective piping also allows for high system security both in context with atmospheric conditions or partial vacuum conditions. According to the embodiment described by referring to FIG. 9, valves 16a are arranged between the vacuum oil tank 12 and the partial vacuum area defined by the inner housing 11.1a of the gearbox device 11. This arrangement is favourable especially also in view of cost efficiency.

FIG. 9A illustrates normal oil flow conditions resp. a standard operating mode (dashed line); oil flow passes via the gearbox inner housing 11.1a, pipe 15.1, vacuum oil tank 12, one of redundant automatic valves 16a and pipes 15.6, 15.7 (redundant atmospheric coupling between oil tank 12 and gearbox device 11), outlet pipe 1d and recirculates to the main tank 1 (by gravity). Further, oil flow also passes from main lube oil tank 1 via line 15.9 to the gearbox housing 11.1 (not passing via but passing by the inner volume 11.1a) and to outlet pipe 1d, thereby recirculating to main lube oil tank 1 (by gravity). Thus, oil flow at atmospheric pressure conditions may include two path of oil flow.

Referring to FIG. 9B, it should be noted that partial vacuum is provided within the section starting from shaft end sealings 11.3 and shaft sealings 11.4 via the inner gearbox housing 11.1a and line 15.1 and vacuum oil tank 12 to the point/place of the vacuum pump 14 (dotted line showing the section to which partial vacuum is provided).

FIG. 9C illustrates an oil flow condition (chain line) in context with a partial vacuum applied to the arrangement, wherein oil flow passes from the main lube oil tank 1 via the gearbox inner housing 11.1a and pipe 15.1 and vacuum oil tank 12 to oil pump 13, and then recirculates (is recirculated) to the gearbox 11. Further, oil flow also passes from main lube oil tank 1 via line 15.9 to the gearbox housing 11.1 (not passing via but passing by the inner volume 11.1a) and to outlet pipe 1d, thereby recirculating to main lube oil tank 1 (by gravity). Thus, also in this mode of operation, oil flow may include two path of oil flow.

It should be noted that the arrangement described above also allows the oil pump to use the gearbox casing/housing as an intermediate oil tank before redirecting/recirculating the oil back to the (customer's) main lube oil tank by gravity.

Referring to FIGS. 9, oil flow in standard/normal conditions (resp. standard modes of operation) is illustrated by a/the respective dashed line, and a section provided with partial vacuum is illustrated by a/the dotted line (separately in FIG. 9B only), and oil flow in partial vacuum mode is illustrated by a/the respective chain line.

In FIGS. 7, 8, 9, the symbol "<" refers to gravity driven oil outlets. Oil outlet resp. oil recirculation to main lube oil tank 1 based on gravity can be a customer requirement (demand of an operator of a/the plant) and can be realized in favourable manner especially also in context with the present invention.

What is claimed is:
1. A gearbox arrangement, comprising:
   at least one turbo gearbox device, wherein the gearbox arrangement is designed to provide a partial vacuum within the gearbox device;
   a vacuum pump communicating with an inner volume of the gearbox device;
   a vacuum oil tank;
   an oil pump coupled to the vacuum oil tank;
   a plurality of valves, wherein the vacuum oil tank and at least one of the plurality of valves are designed to provide a selectable/switchable siphon arrangement such that a predefinable vacuum level is ensured within the inner volume by means of the vacuum pump and via the vacuum oil tank;
   a piping connecting the vacuum oil tank and the gearbox device and the vacuum pump,
   a sensor unit comprising at least one sensor; and
   a control unit designed to control at least the vacuum pump and the oil pump respectively depending on actual sensor data of the at least one sensor,
   wherein the predefinable vacuum level is controllable by controlling the vacuum pump depending on the actual sensor data of the at least one sensor, the sensor data comprising at least one of the following types of data: pressure sensor data related to a vacuum level within the inner volume, and air leakage sensor data related to the gearbox device.

2. The gearbox arrangement of claim 1, wherein the vacuum pump is communicating with the inner volume of the gearbox device via the vacuum oil tank; and/or
   wherein the plurality of valves comprises at least one automatic valve designed to link the vacuum oil tank back to the gearbox device in an open state and to ensure a siphon function in a closed state; and/or
   wherein the selectable/switchable siphon arrangement is selectable/switchable by means of at least one automatic valve arranged on at least one atmospheric coupling pipe of the piping connecting the vacuum oil tank and the gearbox device; and/or
   the gearbox arrangement further comprising an inner gearbox housing which defines the inner volume; and shaft sealings designed to prevent air from entering the inner volume, wherein the vacuum pump communicates with the inner volume via the vacuum oil tank according to at least one mode of operation.

3. The gearbox arrangement of claim 1, wherein the gearbox arrangement is designed to self-adjust a power setting of the vacuum pump depending on the actual sensor data of the at least one sensor such that the predefined vacuum level is ensured both within the inner volume and within the vacuum oil tank; and/or
   wherein the gearbox arrangement is designed to ensure within the inner volume a pressure which is reduced by at least 50% as compared to ambient atmospheric pressure; and/or
   the gearbox arrangement further comprising an inner gearbox housing wherein the gearbox device comprises at least one shaft sealing designed to prevent air from entering the inner gearbox housing, wherein the gearbox arrangement is designed to control the power setting of the vacuum pump depending on the actual sensor data related to an actual amount of air flow entering the gearbox device.

4. The gearbox arrangement of claim 1, further comprising an oil high-pressure system designed to actuate at least some of the plurality of valves, said oil high-pressure system comprising a further oil pump and a plurality of check valves designed to prevent valve opening.

5. The gearbox arrangement of claim 4, wherein the oil high-pressure system is designed to actuate at least one automatic valve correlated with at least one atmospheric coupling pipe of the piping connecting the vacuum oil tank and the gearbox device.

6. The gearbox arrangement of claim 1, further comprising a lubricating system, said oil pump being connected and designed to supply oil from the vacuum oil tank to the lubricating system, wherein the gearbox arrangement is designed to self-adjust a power setting of the oil pump depending on actual oil sensor data, and/or wherein the oil pump is independent from a main lube oil tank of the gearbox device, and/or wherein the oil pump is arranged and designed to supply oil via the gearbox device to an oil outlet pipe for oil flow driven by gravity from the gearbox device back to the main lube oil tank.

7. The gearbox arrangement of claim 1, wherein the piping connecting the vacuum oil tank and the gearbox device at least comprises the following pipes: suction pipe connecting the gearbox inner volume and the vacuum oil tank, oil pipe connecting the vacuum oil tank and the oil pump and the gearbox device, and at least one atmospheric coupling pipe directly connecting the vacuum oil tank and the gearbox device; and/or
wherein the plurality of valves at least comprises the following automatic valves:
at least one automatic valve arranged on an atmospheric coupling pipe directly connecting the vacuum oil tank and the gearbox device, at least one automatic valve respectively linking an upper part of the vacuum oil tank and an upper part of the gearbox device to the atmosphere; and/or
wherein the plurality of valves at least also comprises at least one automatic valve adjusting a quantity of oil delivered to cool a gearing/toothing of the gearbox device; and/or
wherein the plurality of valves at least comprises one automatic valve arranged on the atmospheric coupling pipe connecting the vacuum oil tank and the gearbox device, and one automatic valve arranged on a pipe linking the vacuum oil tank to the atmosphere.

8. The gearbox arrangement of claim 1, wherein the vacuum pump is cooled and/or lubricated via an oil circulation of the gearbox arrangement; and/or
wherein an exhaust pipe from the vacuum pump is linked to the gearbox device, at least indirectly via an atmospheric coupling pipe.

9. The gearbox arrangement of claim 8, wherein the vacuum pump is cooled and/or lubricated via a separate oil suction/feeding pipe and a separate oil refeeding pipe.

10. The gearbox arrangement of claim 1, wherein the gearbox arrangement is designed to provide oil from the vacuum oil tank and also for cooling a gearing/toothing of the gearbox device and/or to lubricate at least the gearbox device and/or to lubricate further components of the gearbox arrangement; and/or wherein the gearbox arrangement is designed for both embedded and stand-alone implementation of vacuum and oil pumping components.

11. The gearbox arrangement of claim 1, wherein at least vacuum components are embedded into the gearbox device; or wherein at least vacuum components are provided in a stand-alone configuration providing for a bypass permitting maintenance, irrespective of an operating state of the gearbox device; and/or wherein the sensor unit comprises at least one accelerometer and is designed to measure at least one vibration parameter of at least the vacuum pump; and/or wherein the control unit is designed to self-control a (re)start process of the gearbox arrangement.

12. The gearbox arrangement of claim 11, wherein the gearbox arrangement comprises an energy storage unit designed to provide energy to the gearbox arrangement.

13. The gearbox arrangement of claim 1, wherein the gearbox arrangement is designed to control at least the following two kinds of oil flow to the gearbox device: oil flow to a toothing of the gearbox device and oil flow to at least one bearing of the gearbox device.

14. The gearbox arrangement of claim 1, wherein the vacuum pump is communicating with the inner volume of the gearbox device via the vacuum oil tank by means of a suction pipe directly coupling the vacuum pump and the vacuum oil tank.

15. A method of providing and maintaining partial vacuum within at least one turbo gearbox device in a gearbox arrangement, the method comprising:
connecting a vacuum pump to communicate with an inner volume of the gearbox device via a vacuum oil tank;
coupling an oil pump to the vacuum oil tank to connect an oil flow to the gearbox device and optionally also to a lubricating piping;
establishing with the vacuum oil tank and at least one automatic valve a selectable/switchable siphon arrangement such that a predefinable vacuum level is ensured within the inner volume by means of the vacuum pump and via the vacuum oil tank;
controlling with a control unit at least the vacuum pump and the oil pump respectively depending on actual sensor data of a sensor unit comprising at least one sensor for ascertaining pressure, temperature or oil level respectively; and
controlling the predefinable vacuum level by controlling the vacuum pump depending on the actual sensor data of the at least one sensor, the sensor data comprising at least one of the following types of data: pressure sensor data related to the vacuum level within the Inner volume, and air leakage sensor data related to the gearbox device.

16. The method of claim 15, further comprising:
actuating at least another automatic valve for linking the vacuum oil tank back to the gearbox device in an open state and for ensuring a siphon function in a closed state, thereby selecting/switching the siphon arrangement; and/or
monitoring an actuation parameter of at least another automatic valve; and/or
self-adjusting a power setting of the vacuum pump depending on the actual sensor data of the at least one sensor such that the predefined vacuum level is ensured both within the inner volume and within the vacuum oil tank; and/or
reducing the pressure within the inner volume by at least 50% as compared to ambient atmospheric pressure.

17. The method of claim 16, wherein the actuation parameter is an opening/closing time required for actuating the at least another automatic valve.

18. The method of claim 15, further comprising controlling at least one of the following parameters: oil level in vacuum oil tank, vacuum level within inner volume of the gearbox device and within an upper part of vacuum oil tank, speed/power setting of the vacuum pump, speed/power setting of the oil pump, valve position of automatic valves controlling a manner of coupling oil flow from the vacuum oil tank via the gearbox device to a main lube oll tank, temperature of the vacuum pump, temperature of electric motors of the oil pump and of the vacuum pump, and position of the automatic valves controlling an oil flow cooling a gearing/toothing of the gearbox device.

19. The method of claim 15, further comprising measuring at least one vibration parameter of at least the vacuum pump of the gearbox arrangement by at least one accelerometer.

20. The method of claim 15, further comprising:
controlling at least an oil flow to a toothing of the gearbox device depending on actual vacuum level; and/or
controlling the vacuum pump by a computer-implemented method.

* * * * *